(12) United States Patent
Sekiguchi

(10) Patent No.: US 7,839,541 B2
(45) Date of Patent: Nov. 23, 2010

(54) IMAGE EDITING SYSTEM AND METHOD THEREFOR

(75) Inventor: Kenzou Sekiguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 11/166,132

(22) Filed: Jun. 27, 2005

(65) Prior Publication Data

US 2006/0001932 A1    Jan. 5, 2006

(30) Foreign Application Priority Data

Jun. 30, 2004    (JP)  ............................... 2004-194892

(51) Int. Cl.
*H04N 1/387*    (2006.01)

(52) U.S. Cl. ........................ 358/452; 345/619; 358/453; 358/537; 358/538; 382/187; 382/309; 382/311; 715/209; 715/211; 715/810

(58) Field of Classification Search ................ 358/452; 345/619, 581, 418; 382/309, 311
See application file for complete search history.

(56) References Cited

U.S. PATENT DOCUMENTS

| | | | | |
|---|---|---|---|---|
| 4,815,029 A | * | 3/1989 | Barker et al. ................. | 715/205 |
| 5,079,625 A | * | 1/1992 | Kitamura et al. ............. | 358/537 |
| 5,353,126 A | * | 10/1994 | Aoyama ...................... | 358/452 |
| 5,734,761 A | * | 3/1998 | Bagley ........................ | 382/309 |
| 5,761,340 A | | 6/1998 | Suzuki ....................... | 382/189 |
| 5,825,941 A | * | 10/1998 | Linford et al. .............. | 382/294 |
| 6,883,140 B1 | * | 4/2005 | Acker et al. ................. | 715/730 |
| 2003/0158788 A1 | * | 8/2003 | Turpin et al. .................. | 705/26 |
| 2003/0179214 A1 | * | 9/2003 | Saund et al. ................. | 345/619 |

FOREIGN PATENT DOCUMENTS

| | | |
|---|---|---|
| EP | WO 01-16691 | 3/2001 |
| JP | 6-32611 | 12/1994 |
| JP | 7-58938 | 3/1995 |
| JP | 9-116738 | 5/1997 |
| JP | 9-305070 | 11/1997 |
| WO | WO 9303473 A1 * | 2/1993 |

\* cited by examiner

*Primary Examiner*—King Y Poon
*Assistant Examiner*—David S Cammack
(74) *Attorney, Agent, or Firm*—Fitzpatrick, Cella, Harper & Scinto

(57) ABSTRACT

This invention provides an image editing method having a selecting step of selecting an edit target area, a cancellation step of canceling a selection of the edit target area selected in the selecting step, and an area selecting step of selecting again the edit target area by indicating the inside of the edit target area.

9 Claims, 26 Drawing Sheets

DATA OBJECT MANAGEMENT TABLE

| OBJECT ID | PEN INPUT DATA | DATA CLASSIFICATION | DATA CONTENT |
|---|---|---|---|
| Oa | (PVa11, PVa12, ..., PVa1Na1), (PVa21, PVa22, ..., PVa2Na2), ..., (PVaMa1, PVaMa2, ..., PVaMaNaMa) | CHARACTER STRING | "a b c" |
| Ob | (PVb11, PVb12, ..., PVb1Nb1), (PVb21, PVb22, ..., PVb2Nb2), ..., (PVbMb1, PVbMb2, ..., PVbMbNbMb) | GRAPHIC FORM | (Ob1, Ob2, Ob3) |
| Oc | NONE | CHARACTER STRING | Abcdefg HIJKLMN Opqrstu XYZ" |

FIG.8

COORDINATE CONVENTION MANAGEMENT TABLE

| AREA ID | RECTANGULAR AREA | AREA CLASSIFICATION | ALTERNATE TOKEN | AREA CORRESPONDENCE PROCESSING OBJECT | COMMENT |
|---|---|---|---|---|---|
| a | (aUL, aUR, aBL, aBR) | EDIT | NONE | Proc - A | EDIT TARGET AREA |
| b | (bUL, bUR, bBL, bBR) | BUTTON | ⟨NT⟩ | Proc - A | NEW AREA MODE |
| c | (cUL, cUR, cBL, cBR) | BUTTON | ⟨ST⟩ | Proc - A | AREA SELECTION MODE |
| d | (dUL, dUR, dBL, dBR) | BUTTON | ⟨CT⟩ | Proc - A | AREA SELECTION CANCELLATION MODE |
| e | (eUL, eUR, eBL, eBR) | BUTTON | ⟨IT⟩ | Proc - A | HANDWRITTEN INPUT MODE |
| f | (fUL, fUR, fBL, fBR) | BUTTON | ⟨FT1⟩ | Proc - A | TRIMMING |
| g | (gUL, gUR, gBL, gBR) | BUTTON | ⟨FT2⟩ | Proc - A | MASKING |
| h | (hUL, hUR, hBL, hBR) | BUTTON | ⟨FT3⟩ | Proc - A | GRAPHIC FORM SHAPING |
| i | (iUL, iUR, iBL, iBR) | BUTTON | ⟨FT4⟩ | Proc - A | DATA DELETION |
| j | (jUL, jUR, jBL, jBR) | BUTTON | ⟨FT5⟩ | Proc - A | IMAGE TO CHARACTER CODE CONVERSION |
| k | (kUL, kUR, kBL, kBR) | BUTTON | ⟨FT6⟩ | Proc - A | HANDWRITING TO CHARACTER CODE CONVERSION |

FIG.10

EDIT AREA MANAGEMENT TABLE

| AREA ID | SELECTION STATE | CLASSIFI-CATION | AREA VECTOR | INCLUDED AREA | INCLUDED OBJECT |
|---|---|---|---|---|---|
| a | NOT SELECTED | RECTANGULAR AREA | ( a1, a2, ···, a4 ) | b, c | NONE |
| b | NOT SELECTED | RECTANGULAR AREA | ( b1, b2, ···, b4 ) | NONE | NONE |
| c | NOT SELECTED | RECTANGULAR AREA | ( c1, c2, ···, c4 ) | NONE | NONE |

FIG.11

EDIT AREA MANAGEMENT TABLE

| AREA ID | SELECTION STATE | CLASSIFI-CATION | AREA VECTOR | INCLUDED AREA | INCLUDED OBJECT |
|---|---|---|---|---|---|
| a | NOT SELECTED | RECTANGULAR AREA | ( a1, a2, ···, a4 ) | c, d | NONE |
| b | NOT SELECTED | RECTANGULAR AREA | ( b1, b2, ···, b4 ) | NONE | NONE |
| c | NOT SELECTED | RECTANGULAR AREA | ( c1, c2, ···, c4 ) | NONE | NONE |
| d | SELECTED | HANDWRITTEN AREA | ( d1, d2, ···, dNd ) | b | NONE |

FIG.12

EDIT AREA MANAGEMENT TABLE

| AREA ID | SELECTION STATE | CLASSIFICATION | AREA VECTOR | INCLUDED AREA | INCLUDED OBJECT |
|---|---|---|---|---|---|
| a | NOT SELECTED | RECTANGULAR AREA | (a1, a2, ···, a4) | c, d | Oa |
| b | NOT SELECTED | RECTANGULAR AREA | (b1, b2, ···, b4) | NONE | NONE |
| c | NOT SELECTED | RECTANGULAR AREA | (c1, c2, ···, c4) | NONE | NONE |
| d | NOT SELECTED | HANDWRITTEN AREA | (d1, d2, ···, dNd) | b | NONE |

FIG.13

EDIT AREA MANAGEMENT TABLE

| AREA ID | SELECTION STATE | CLASSIFI-CATION | AREA VECTOR | INCLUDED AREA | INCLUDED OBJECT |
|---|---|---|---|---|---|
| a | NOT SELECTED | RECTANGULAR AREA | ( a1, a2,···, a4 ) | c, d, e | NONE |
| b | NOT SELECTED | RECTANGULAR AREA | ( b1, b2,···, b4 ) | NONE | NONE |
| c | NOT SELECTED | RECTANGULAR AREA | ( c1, c2,···, c4 ) | NONE | NONE |
| d | NOT SELECTED | HANDWRITTEN AREA | ( d1, d2,···, dNd ) | b | NONE |
| e | SELECTED | HANDWRITTEN AREA | ( e1, e2,···, eNe ) | NONE | Oa |

FIG.14

EDIT AREA MANAGEMENT TABLE

| AREA ID | SELECTION STATE | CLASSIFI-CATION | AREA VECTOR | INCLUDED AREA | INCLUDED OBJECT |
|---|---|---|---|---|---|
| a | NOT SELECTED | RECTANGULAR AREA | (a1, a2, ···, a4) | c, d, e | Ob |
| b | NOT SELECTED | RECTANGULAR AREA | (b1, b2, ···, b4) | NONE | NONE |
| c | NOT SELECTED | RECTANGULAR AREA | (c1, c2, ···, c4) | NONE | NONE |
| d | NOT SELECTED | HANDWRITTEN AREA | (d1, d2, ···, dNd) | b | NONE |
| e | NOT SELECTED | HANDWRITTEN AREA | (e1, e2, ···, eNe) | NONE | Oa |

FIG.15

EDIT AREA MANAGEMENT TABLE

| AREA ID | SELECTION STATE | CLASSIFI-CATION | AREA VECTOR | INCLUDED AREA | INCLUDED OBJECT |
|---|---|---|---|---|---|
| a | NOT SELECTED | RECTANGULAR AREA | ( a1, a2,···, a4 ) | c, d, e, f | NONE |
| b | NOT SELECTED | RECTANGULAR AREA | ( b1, b2,···, b4 ) | NONE | NONE |
| c | NOT SELECTED | RECTANGULAR AREA | ( c1, c2,···, c4 ) | NONE | NONE |
| d | NOT SELECTED | HANDWRITTEN AREA | ( d1, d2,···, dNd ) | b | NONE |
| e | NOT SELECTED | HANDWRITTEN AREA | ( e1, e2,···, eNe ) | NONE | Oa |
| f | SELECTED | HANDWRITTEN AREA | ( f1, f2,···, fNf ) | NONE | Ob |

FIG.16

EDIT AREA MANAGEMENT TABLE

| AREA ID | SELECTION STATE | CLASSIFI-CATION | AREA VECTOR | INCLUDED AREA | INCLUDED OBJECT |
|---|---|---|---|---|---|
| a | NOT SELECTED | RECTANGULAR AREA | (a1, a2, ···, a4) | c, d, e, f | NONE |
| b | NOT SELECTED | RECTANGULAR AREA | (b1, b2, ···, b4) | NONE | NONE |
| c | NOT SELECTED | RECTANGULAR AREA | (c1, c2, ···, c4) | g | NONE |
| d | NOT SELECTED | HANDWRITTEN AREA | (d1, d2, ···, dNd) | b | NONE |
| e | NOT SELECTED | HANDWRITTEN AREA | (e1, e2, ···, eNe) | NONE | Oa |
| f | NOT SELECTED | HANDWRITTEN AREA | (f1, f2, ···, fNf) | NONE | Ob |
| g | SELECTED | HANDWRITTEN AREA | (g1, g2, ···, gNg) | NONE | NONE |

FIG.17

EDIT AREA MANAGEMENT TABLE

| AREA ID | SELECTION STATE | CLASSIFI-CATION | AREA VECTOR | INCLUDED AREA | INCLUDED OBJECT |
|---|---|---|---|---|---|
| a | NOT SELECTED | RECTANGULAR AREA | (a1, a2, ⋯, a4) | c,d,e,f | NONE |
| b | NOT SELECTED | RECTANGULAR AREA | (b1, b2, ⋯, b4) | NONE | NONE |
| c | NOT SELECTED | RECTANGULAR AREA | (c1, c2, ⋯, c4) | g | NONE |
| d | NOT SELECTED | HANDWRITTEN AREA | (d1, d2, ⋯, dNd) | b | NONE |
| e | NOT SELECTED | HANDWRITTEN AREA | (e1, e2, ⋯, eNe) | NONE | Oa |
| f | NOT SELECTED | HANDWRITTEN AREA | (f1, f2, ⋯, fNf) | NONE | Ob |
| g | NOT SELECTED | HANDWRITTEN AREA | (g1, g2, ⋯, gNg) | NONE | Oc |

FIG.18

IMAGE EDITING SYSTEM AND METHOD THEREFOR

BACKGROUND OF THE INVENTION

1. Field of the Invention

The present invention relates to an image editing system for editing image data scanned by a scanner, a method there for, and a program therefor.

2. Description of the Related Art

In recent years, a device for editing image data that was scanned by a scanner using a tablet pen has emerged. For example, there is a handwriting input device that displays image data on a tablet display device in which a tablet serving as a pointing device and a display device are integrated and that allows the user to enclose an image data area to be edited with a pen and perform various editing operations such as, deletion and extraction of image data, on that area. For example, Japanese Patent Application Laid-open No. 6-332611 (1994) discloses such a device.

Moreover, as another example, there is an image editing device where an editing menu is printed on temporary output paper along with scanned image data, an editing area is marked with a marker pen on the temporary output paper, then check marks are written in the editing items in an editing menu, and subsequently the temporary output paper is scanned by a scanner of the image editing device to edit the image data. For example, Japanese Patent Application Laid-open No. 7-58938 (1995) discloses such a device.

Furthermore, in these days, a notepad device for computerizing information of handwriting has appeared thanks to miniaturization and advancement of electronic parts in recent years. For example, a patent brochure of International Publication Number WO 01-16691 discloses such a device. In this device, when something is written with a digital pen acting as a pointing device on recording paper that records a dot pattern of an image expressing two-dimensional coordinates, the digital pen reads the dot pattern on the above-mentioned recording paper. Subsequently, handwriting data (data of chained two-dimensional coordinates) that the pen has read is transmitted to a PC (personal computer) through radio communication equipment.

Outline of the digital pen will be described here. The digital pen is covered with a pen-shape cover, whose top is opened. Inside the top, an optical reader and at least one light emitting diode are housed. In further interior thereof, a central processing unit, memory, and a battery are housed. Furthermore, a nib having ink in it exists in the end of the cover that is opened. Moreover, the digital pen has a button for controlling the open and a communication unit for communicating with other devices.

However, in the handwritten input device of Japanese Patent Application Laid-open No. 6-332611 (1994), a selected area in an image data area that is enclosed with a handwritten line will be reset by editing. Consequently, when applying edit processing to the same selected area, it is necessary to specify the selected area again by handwriting, which is very cumbersome.

Moreover, in an image editing device of Japanese Patent Application Laid-open No. 7-58938 (1995), in order to edit images of a manuscript, the following processing is required: the manuscript is scanned, the manuscript images and edit processing contents are printed on the temporary output paper, and the user encloses an edit target area of the temporary output paper with a marker pen. Then, the temporary output paper is checked using an edit processing marker pen, and subsequently the checked temporary output paper is scanned again by a scanner of the image editing device. The whole processing is very cumbersome. In addition, when editing an edited image again, it is necessary to scan again the output paper of the image that is outputted from a result of the previous editing and perform the same operation as the previous editing, which is even more cumbersome. Furthermore, repeating scanning and printing many times causes degradation in quality of the image.

Moreover, "Notepad" of a brochure of International Publication Number WO 01-16691 relates to processing on data that was written with a pen, and consequently the image data scanned by a scanner can not be edited and processing options for an object that has already been written with the pen cannot be selected.

The conventional system has various problems as described above, and so further improvement is desired.

SUMMARY OF THE INVENTION

This invention was devised in view of such problems, and its object is to provide a print control device capable of executing printing efficiently, a print control method, and a program therefor.

This invention was devised in view of such a situation, and its object is to provide an image editing system featured with improved operability and suppressed degradation in image equality, a method therefor, and a program therefor.

In order to attain an object like this, according to this invention, an image editing system that stores image data scanned by image scanning means in means for storing image data, and, in specifying an edit target area in order to edit the stored image data, makes the display medium display the image data and an area where an edit function for the stored image data is selected, with a position indicated by position indicating means on the display medium corresponding to a position in the image data, has new area processing means for selecting one or a plurality of new edit target areas by enclosing the edit target area using the position indicating means, and area selecting means for selecting one or a plurality of edit target areas that were indicated by indicating an area in the edit target area selected by the new area processing means.

Furthermore, in order to attain the above-mentioned object, according to this invention, an image editing system that stores image data scanned by image scanning means in image data storage means, and, in specifying an edit target area in order to edit the stored image data, uses a display medium that displays the image data and an area where an edit function for the stored image data is selected, with a position indicated by position indicating means on the display medium corresponding to a position in the image data is characterized as follows. The image editing system comprises: (1) communication means to communicate using the position indicating means; and (2) data analyzing means that, (a) when a vector of position coordinates on the display medium representing a trace of movement that the position indicating means samples and receives periodically on the display medium is included in an edit area defined beforehand on the display medium, treats the vector of the position coordinates as a first vector, or, (b) when the vector of the position coordinates is included in an area that specifies at least one edit function predefined on the display medium, treats the vector of the position coordinates as a second vector whereby the edit function is identified and convents it into a token for identifying the edit function, and executes processing determined by the first vector subsequently received or the token. Furthermore, the data analyzing means has coordinate conversion management means for managing (i) a rectangular area that includes coordinates of the vector of the position coordinates and that determines the edit area or an area where the edit function is applied and (ii) processing that is applied to the coordinates of the vector of the position coordinates. Moreover, when the image editing system executes processing managed by the coordinate conversion management means, the image editing system executes processing by one of the following means: vector adding means for temporarily saving the first vector; handwritten input processing means for adding the first vector as an object included in the edit area; new are a processing means for selecting one or a plurality of new edit target areas by enclosing an edit target area with a line using the position indicating means; and area selection processing means for selecting again the one or the plurality of edit target areas that were indicated by using the position indicating means to indicate the inside of the edit target area selected by the new area processing means, all of which are processing determined by the state and either of the first vector subsequently received or the token.

Moreover, in order to attain the above-mentioned object, according to this invention, an image editing method of the image editing system that stores image data scanned by image scanning means in image data storage means, and, in specifying an edit target area in order to edit the stored image data, makes a display medium display the image data and an area where an edit function for the stored image data is selected, with a position indicated by position indicating means on the display medium corresponding to a position in the image data comprises: a new area processing step of selecting one or a plurality of new edit target areas by enclosing an edit target area using the position indicating means; and an area processing step of selecting the one or the plurality of edit target areas again that were selected by using the position indicating means to indicate the inside of the edit target area selected in the new area processing step.

Moreover, in order to attain the above-mentioned object, according to this invention, an image editing method of the image editing system that stores image data scanned by image scanning means in image data storage means, and, in specifying an edit target area in order to edit the stored image data, uses a display medium that displays the image data and an area where an edit function for the stored image data is selected, with a position indicated by position indicating means on the display medium corresponding to a position in the image data is characterized as follows. The image editing method of the image editing system comprises: (1) a communication step of communicating with the position indicating means; and (2) a data analysis step of, (a) when a vector of position coordinates on the display medium representing a trace of movement that the position indicating means samples and receives periodically on the display medium is included in an edit area defined beforehand on the display medium, treating the vector of the position coordinates as a first vector, or, (b) when the vector of the position coordinates is included in an area that specifies at least one edit function predefined on the display medium, treating the vector of the position coordinates as a second vector whereby the edit function is identified, converting it into a token for identifying the edit function, and executing processing that is determined by a state determined by the first vector or the token and either of the first vector subsequently received or the token. Furthermore, the data analysis step has a coordinate conversion management step of managing (i) a rectangular area that includes coordinates of the vector of the position coordinates and that determines the edit area or an area specifying the edit function and (ii) processing that is applied to the coordinates of the vector of the position coordinates. Moreover, when the image editing system executes processing managed by the coordinate conversion management means, the image editing system executes processing by one of the following steps: a vector addition step of temporarily saving the first vector; a handwritten input processing step of adding the first vector as an object included in the edit area; a new area processing step of selecting one or a plurality of new edit target areas by enclosing an edit target area with a line using the position indicating means; and an area processing step of selecting the one or the plurality of edit target areas that were indicated again by using the position indicating means to indicate the inside of the edit target area selected in the new area processing step, all of which are processing determined by the state and either of the first vector subsequently received or the token.

By the above configuration of this invention, it is not necessary to enclose an edit area with the pen again in order to specify and select the edit area for an already processed edit target area, and it becomes possible to select an edit target area simply by touching the inside of the edit target area or by writing a check mark. Furthermore, it is not necessary to print a reedited result on the temporary output paper and scan the paper, and so the need to scan the manuscript is reduced to only once. Moreover, the image editing method of this invention makes it possible to edit the image data scanned by a scanner and select a processing option on an object that has already been written with a pen.

This invention takes effect of suppressing degradation in image quality through improvement of operability of an image editing system.

The above and other objects, effects, features and advantages of the present invention will become more apparent from the following description of embodiments thereof taken in conjunction with the accompanying drawings.

BRIEF DESCRIPTION OF THE DRAWINGS

FIG. 8 is a list diagram of a data object management table of an embodiment to which this invention can be applied;

FIG. 10 is a diagram of a coordinate conversion management table of an embodiment to which this invention can be applied;

FIG. 11 is a list diagram of an edit area management table in its initial state of an embodiment to which this invention can be applied;

FIG. 12 is a list diagram of an edit area management table immediately after specifying a first area with a pen of an embodiment to which this invention can be applied;

FIG. 13 is a list diagram of the edit area management table immediately after characters were written with a pen of an embodiment to which this invention can be applied;

FIG. 14 is a list diagram of the edit area management table immediately after specifying using the pen the surrounding of characters written with a pen of an embodiment to which this invention can be applied;

FIG. 15 is a list diagram of the edit area management table immediately after writing a graphic form with a pen of an embodiment to which this invention can be applied;

FIG. 16 is a list diagram of the edit area management table immediately after specifying using the pen the surrounding of a graphic form written with a pen of an embodiment to which this invention can be applied;

FIG. 17 is a list diagram of the edit area management table immediately after specifying using the pen the surrounding of a sentence of an embodiment to which this invention can be applied;

FIG. 18 is a list diagram of the edit area management table immediately after specifying using the pen the surrounding of a sentence of an embodiment to which this invention can be applied as an area and executing "image-to-character conversion";

DETAILED DESCRIPTION OF PREFERRED EMBODIMENTS

Figure 1:
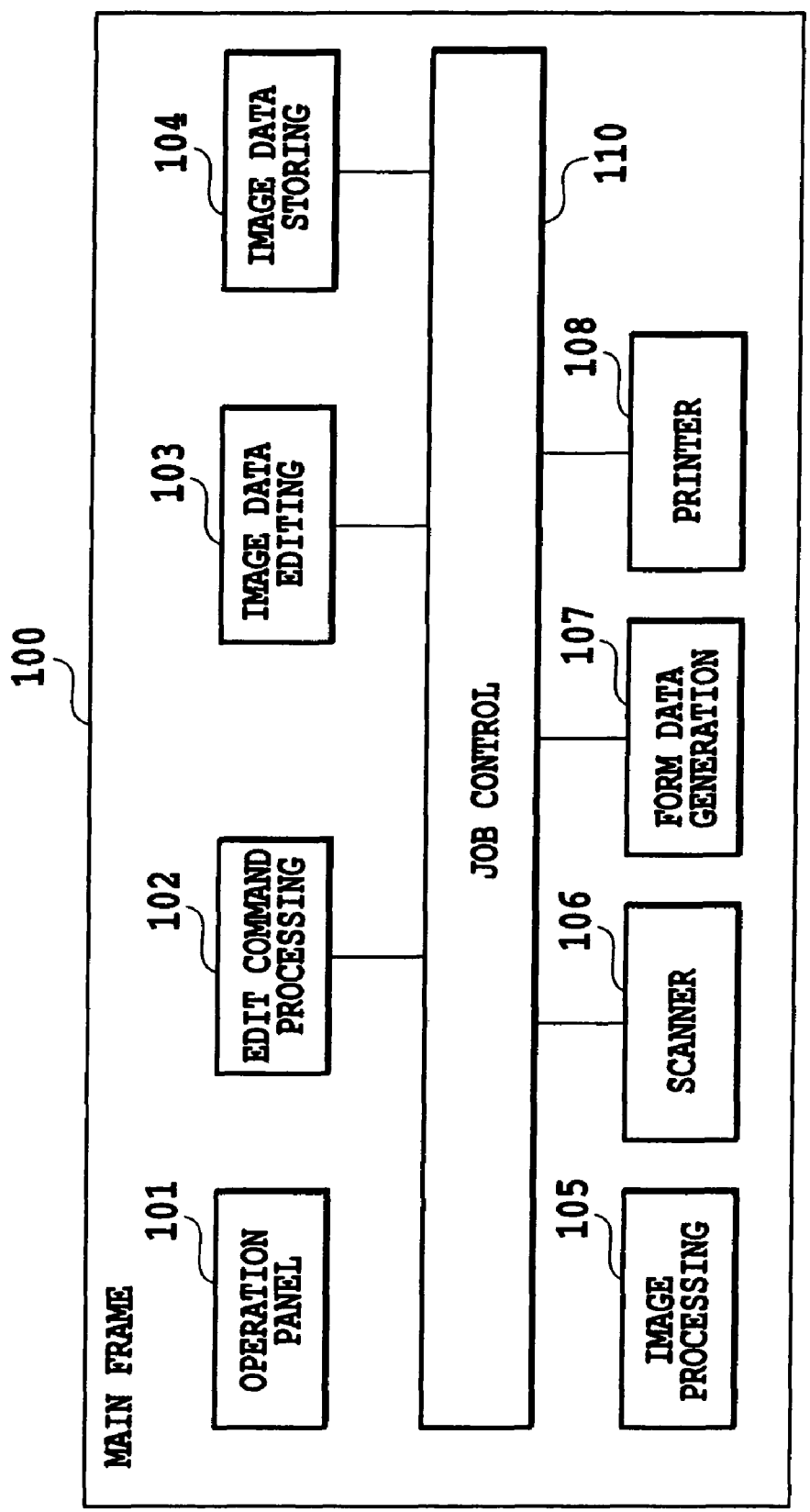
FIG. 1 is a first block diagram of an image editing system of an embodiment to which this invention can be applied.

Hereafter, embodiments to which this invention can be applied will be described in detail. Note that parts having similar functions are designated with the same reference numerals, respectively, in each drawing and redundant explanations are eliminated.

(Device Configuration)

FIG. 1 is a first block diagram of an image editing system of an embodiment to which this invention can be applied. An image editing system in FIG. 1 is a main frame device 100 consisting of a MFP (Multi Functional Peripheral) having a manuscript scanning function and a printing function, FAX equipment, a printer device, etc. Alternatively, this system can be embodied with a PC that has peripheral devices, such as a manuscript scanner and a printer, and an image processing peripheral board.

An operation panel subsystem 101 has a display medium of a liquid crystal panel equipped thereon with a tablet (reference numeral 500 in FIG. 5 indicating a screen for image editing) for sensing handwriting of the pen and a keyboard. The operation panel subsystem 101 is a hardware subsystem and software system for providing functions of control related to display and operation for hardware of the main frame device 100 and of control of tablet input and keyboard entry. Hereafter, the hardware subsystem and the software subsystem are called only a subsystem collectively.

An edit command processing subsystem 102 is a processing unit showing a feature of this embodiment, and is a subsystem managing edit command processing. Details of the edit command processing subsystem 102 will be described later. An image data storage subsystem 104 controls a secondary storage device (not illustrated), such as a HDD (hard disk drive), and stores and manages image data.

An image processing subsystem 105 consists of image processing software, image processing hardware, and control software. The image processing subsystem 105 is equipped with functions of image processing, such as rectangular area extraction and ground removal, on image data scanned by a scanner subsystem 106. Moreover, the image processing subsystem 105 cooperates with a form data generating subsystem 107 and is equipped with several functions, for example, a color space conversion function of converting RGB image data into color components consisting of CMY components with a K (black) component excluded and a two-dimensional coordinate dot-pattern generation function of generating a dot pattern of two-dimensional coordinate ID.

The scanner subsystem 106 in cooperation with the image processing subsystem 105 coverts a manuscript scanned by a manuscript scanner (not illustrated) into image data and stores it in the image data storage subsystem 104. The form data generating subsystem 107 manages form structure data for a form for image editing (reference numeral 500 in FIG. 5), generates its print data, and generates print data for an edit command form (reference numeral 600 in FIG. 6).

A printer subsystem 108 controls a printer device (not illustrated), outputs print data to the printer device, and prints print data for the above-mentioned image editing and for an edit command form on recording paper.

An image data editing subsystem 103 performs image editing processing on image data that was scanned by the scanner subsystem 106 and stored in the image data storage subsystem 104 according to instructions of the edit command processing 102. At the same time, the image data editing subsystem 103 displays an edit state of image data on displays of the operation panel subsystem 101 and edit clients 300, 400 that will be described with reference to FIGS. 3 and 4. The image data editing subsystem 103 stores and manages a data object management table shown in FIG. 8 that will be described later, edit area management tables in FIGS. 11 to 18, etc. in unillustrated memory and the secondary storage means.

The job control subsystem 101 manages control of jobs in the system, and includes an image bus, a system bus, and an image bus I/F for connecting these busses.

Figure 3:
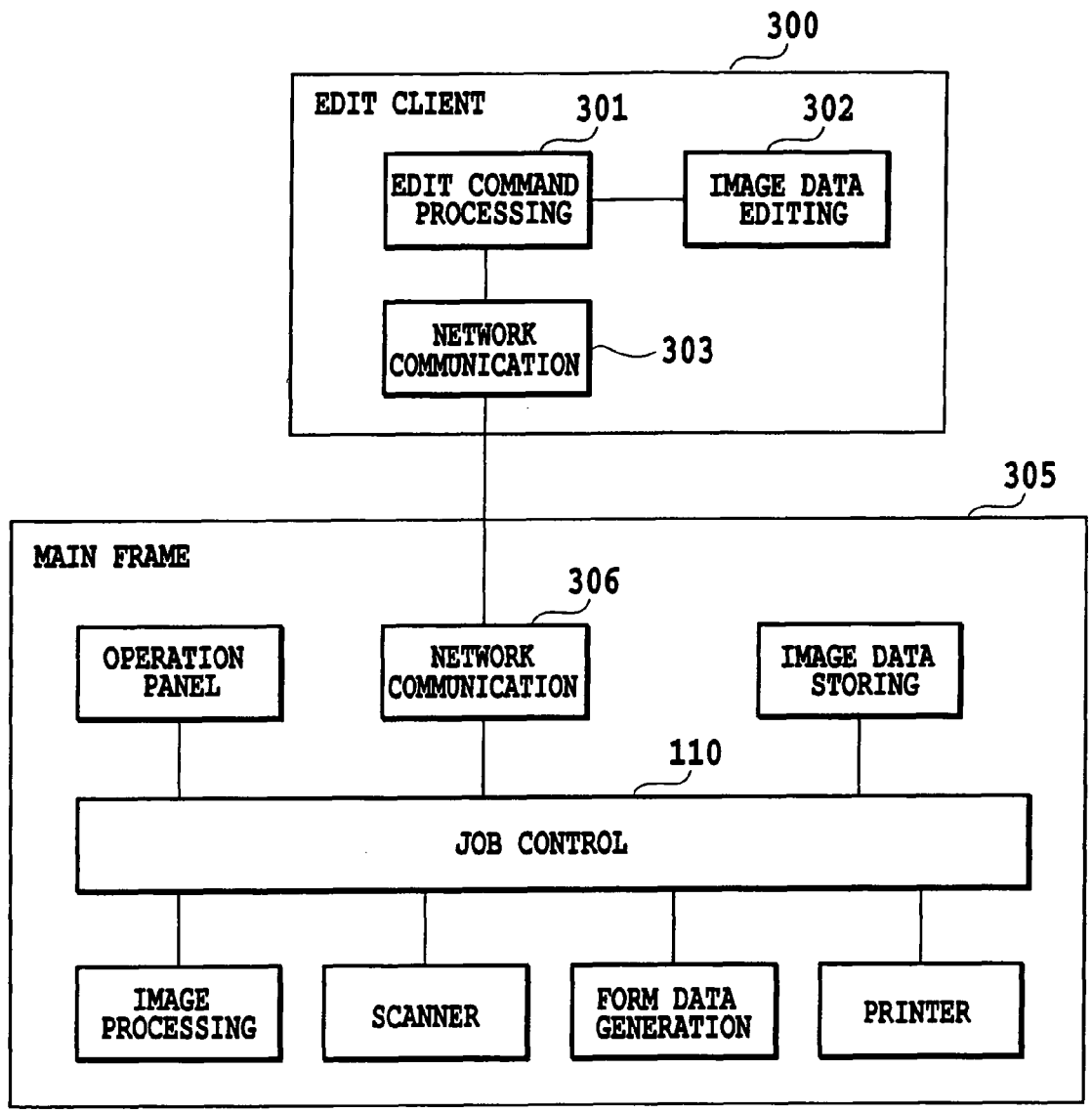
FIG. 3 is a second block diagram of an image editing system of an embodiment to which this invention can be applied.

FIG. 3 shows a second configuration diagram of an image editing system that is an embodiment to which this invention can be applied and also a modification of the image editing system in FIG. 1. Configurational differences between the image editing system in FIG. 3 and that in FIG. 1 will be described. The image editing system in FIG. 3 is a system such that the edit command processing subsystem 102 and the image data editing subsystem 103 in FIG. 1 are separated from the main frame device 100 as the edit client 300. And in the image editing system in FIG. 3, communication between a main frame device 305 and the edit client 300 is conducted between a network communication subsystem 306 provided in the main frame device 305 and a network communication subsystem 303 provided in the edit client 300. The edit client 300 can be implemented on a PC, or may be implemented with a job-oriented terminal.

Next, functional differences between the subsystems of the image editing system in FIGS. 3 and 1 will be described. In the image editing system in FIG. 1, key entry and pen input to the edit command processing subsystem 102 are conducted with a key board of the operation panel subsystem 101 and a display medium of the operation panel subsystem 101 (for example, a tablet device made up by superimposing a touch panel on the display panel). Moreover, in the image editing system in FIG. 1, the input is conducted with a digital pen—disclosed by the above-mentioned International Patent Application Unexamined No. 01/16691—that performs handwriting on image edit paper such that two-dimensional coordinate positions are printed as a dot pattern. Moreover, in the image editing system in FIG. 1, display of an edit state of image data by the image data editing subsystem 103 is performed by a display medium on the operation panel subsystem 101.

On the other hand, in the image editing system in FIG. 3, key entry and pen input to an edit command processing subsystem 301 is conducted with a keyboard and a display medium of the edit client 300, respectively. Moreover, in the image editing system in FIG. 3, the input is conducted with the digital pen for performing handwriting on the image edit paper that is connected to the edit client 300 through wirelesses communication and where the above-mentioned two-dimensional coordinate positions are represented by printing of a dot pattern, or with other devise. Moreover, in the image editing system in FIG. 3, display of an edit state of image data by an image data editing subsystem 302 is performed by the display medium of the edit client 300.

Figure 4:
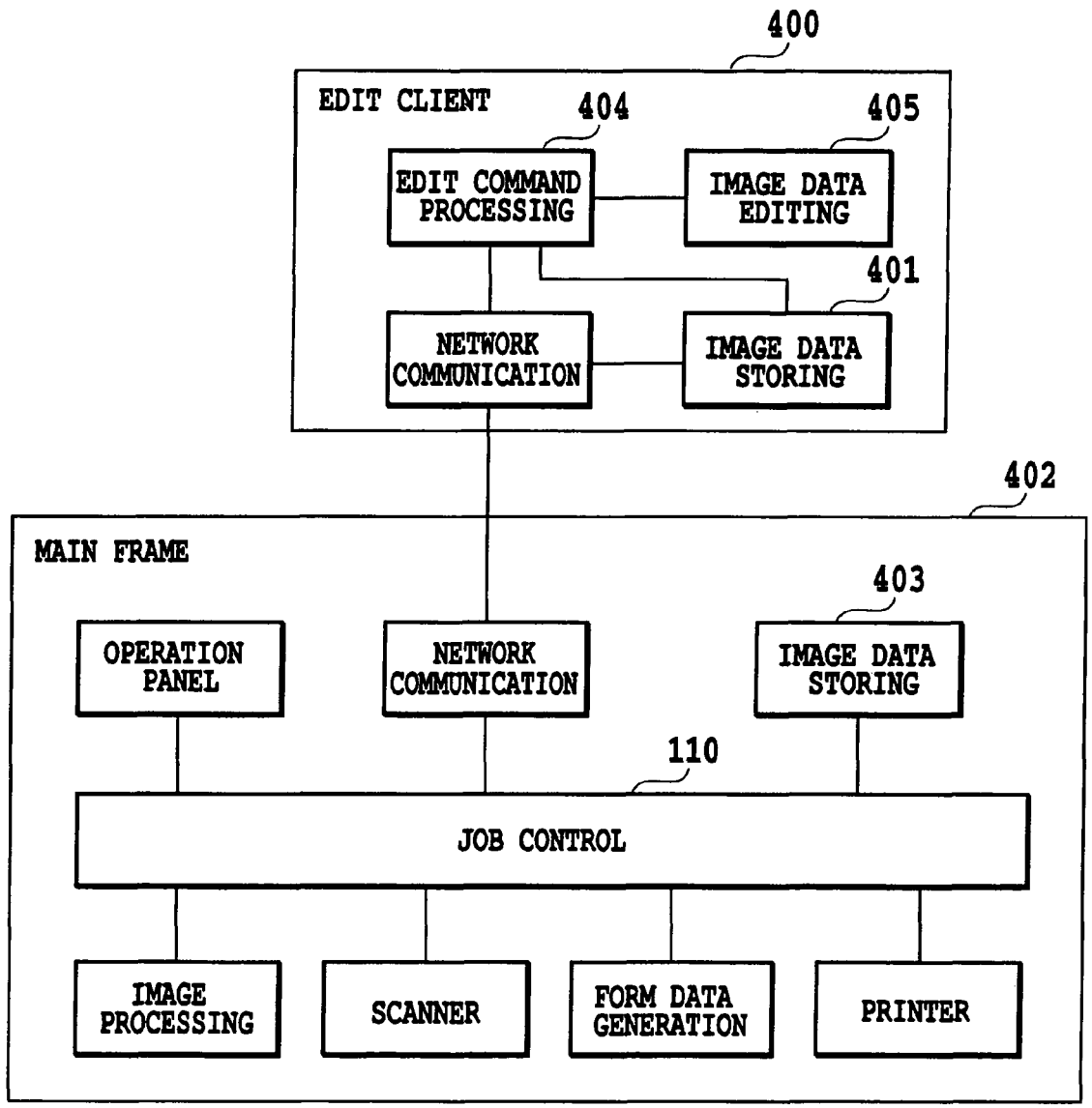
FIG. 4 is a third block diagram of the image editing system of an embodiment to which this invention can be applied.

FIG. 4 is a third block diagram of the image editing system of the embodiment to which this invention can be applied, showing a modification form of the image editing system in FIG. 3. Configurational differences of the image editing system between FIG. 4 and FIG. 3 will be described. The image editing system of FIG. 4 has an image data storage subsystem 401 installed on the edit client 400, and stores image data to be edited from an image data storage subsystem 403 of a main frame device 402 in the image data storage subsystem 401. An image data editing subsystem 405 performs image edit processing on the image data stored in the image data storage subsystem 401 according to instructions of an edit command processing 404.

Figure 2:
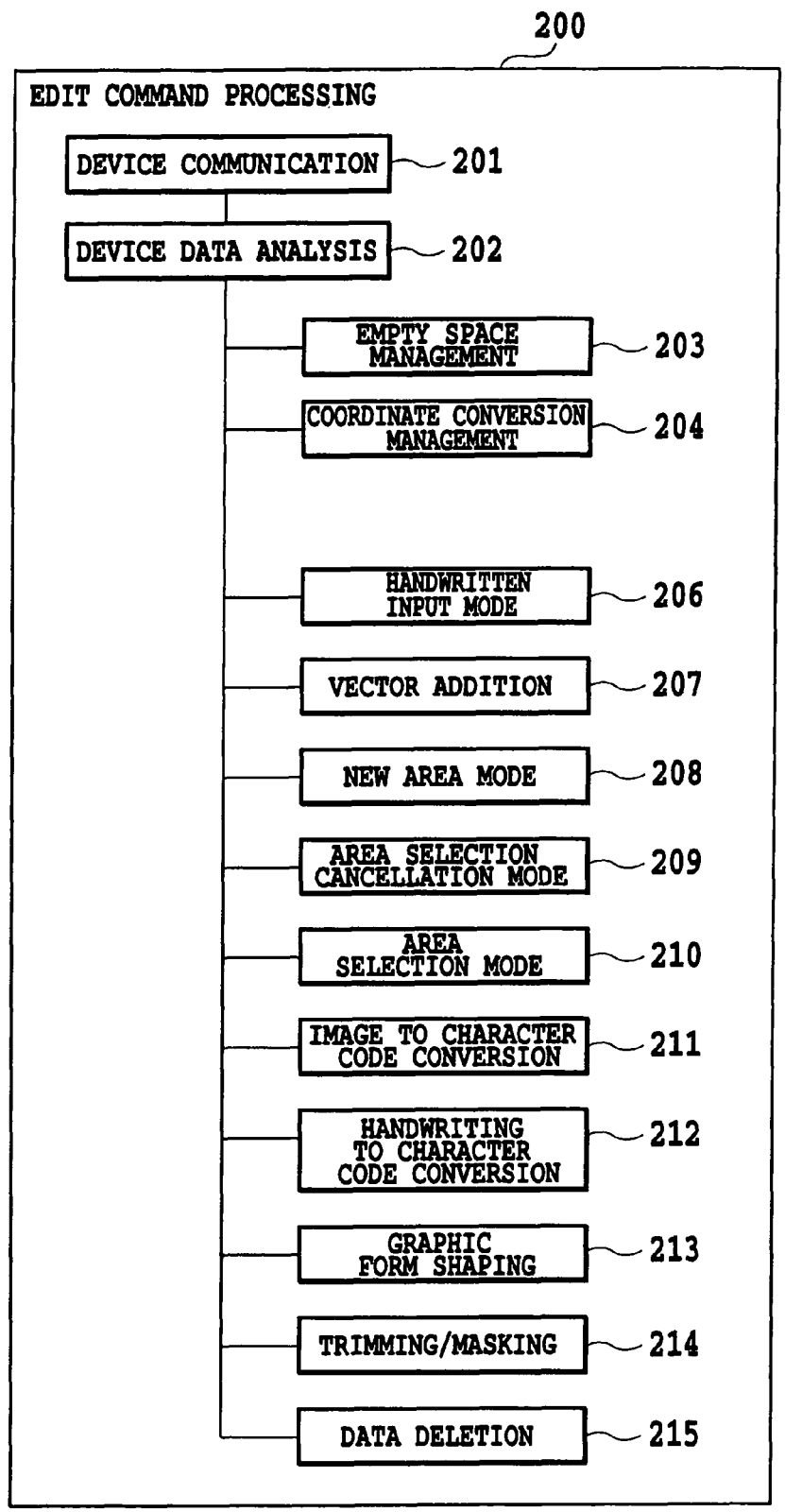
FIG. 2 is a block diagram of an edit command processing subsystem of an embodiment to which this invention can be applied.
Figure 5:
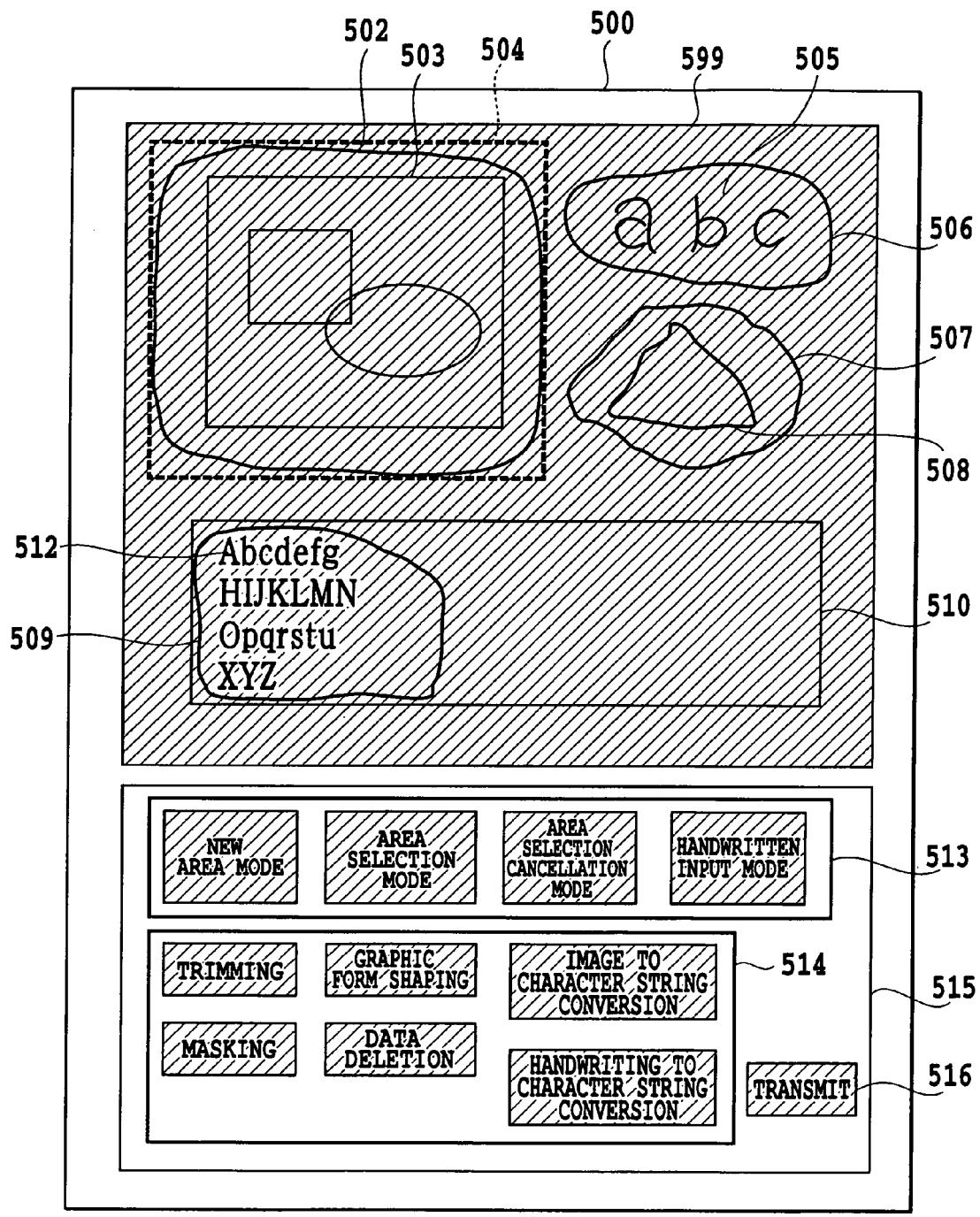
FIG. 5 is a view showing a screen for image edit or a form for image editing of an embodiment to which this invention can be applied.
Figure 6:
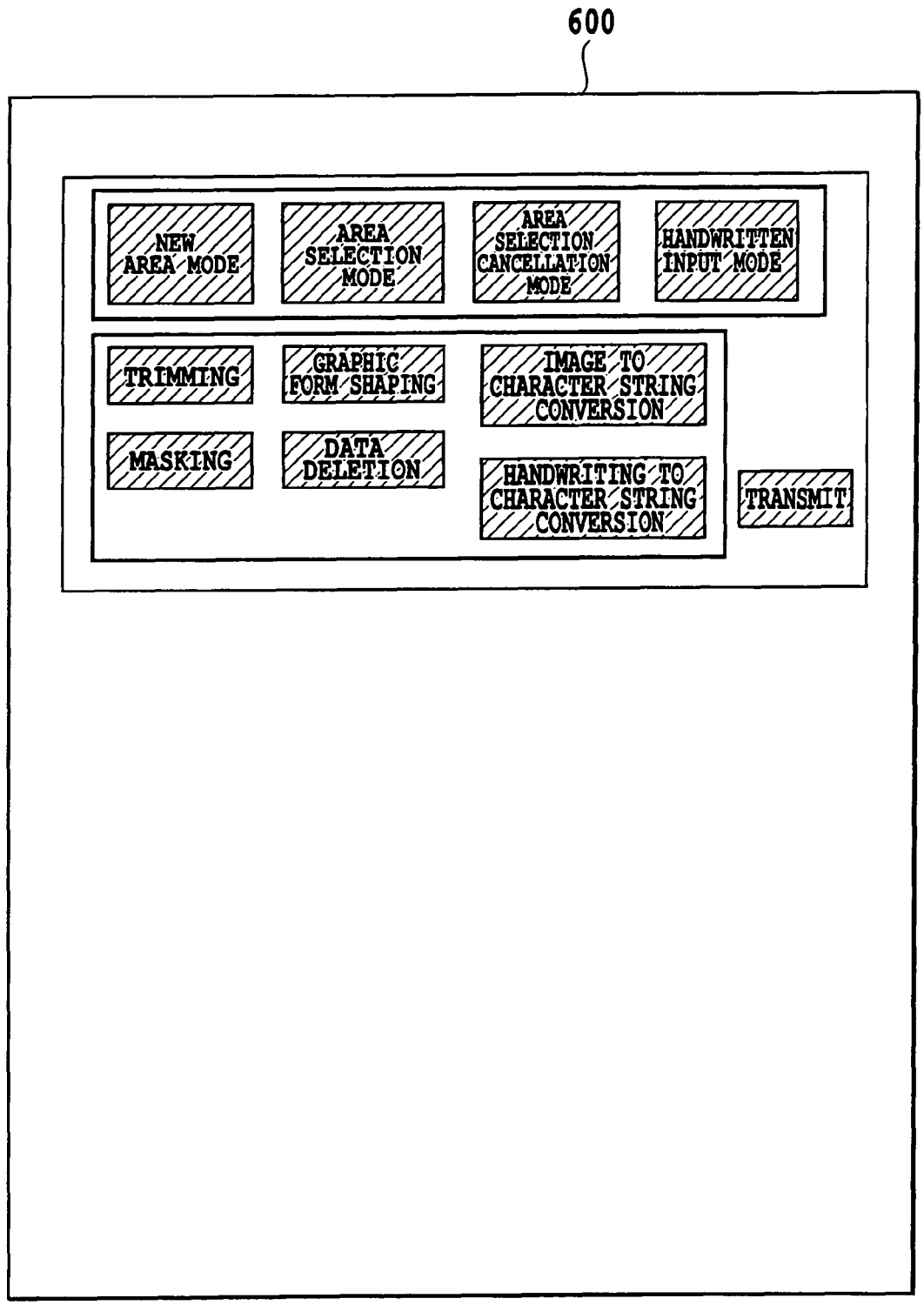
FIG. 6 is a view showing edit command form of a form for image editing of an embodiment to which this invention can be applied.

FIG. 2 is a block diagram of the edit command processing subsystem, showing an internal configuration of the edit command processing subsystems 102, 301, and 404 in FIG. 1, FIG. 3, and FIG. 4. When a screen for image editing or a form for image editing of the tablet, as shown by reference numeral 500 in FIG. 5, is edited with a pen, an edit command processing subsystem 200 in FIG. 2 receives and analyzes handwriting data that is written with a pen on the tablet or with a digital pen.

Outline of the contents of processing is as follows: for handwriting written with a pen, a mode button (any of the mode buttons in reference numeral 513 in FIG. 5) related to the edit target area is selected, and mode processing corresponding to the button is executed on data of the handwriting written on the edit target area 599 with a pen before mode selection.

For example, when the surrounding of a rectangle 503 is enclosed with a pen (area 502), and the new area mode button in reference numeral 513 is checked with a pen, area specification and area selection is newly executed to define image data and handwriting data of a pen inside the area 502 as a target to which functions of trimming, graphic form shaping, etc. are applied. After that, when a function button (any of the function buttons in reference numeral 514 in FIG. 5) is checked with a pen, processing corresponding to the function button selected correspondingly from the selection area described above will be executed. For example, when the trimming button in the function button area 514 in FIG. 5 is checked with a pen in the state where the rectangle 503 in FIG. 5 is selected with the area 502, image data in a rectangle 504 that is circumscribed segments of the area 502 is trimmed (cut away).

Next, constituent parts shown in FIG. 2 will be described. A device communication unit 201 is a part for communicating with a keyboard, a tablet, and a digital pen, and uses wire communication, such as RS-232C (Recommended Standard 232C), USB (Universal Serial Bus), etc., infrared ray communication, such as iRDA (Infrared Data Association), and wireless communications, such as Bruetooth (trademark).

A device data analysis unit 202 is one of parts showing the most salient features of this embodiment. This is a part that analyzes pen data of a tablet and a digital pen that is sampled and received from the device communication unit 201 periodically, and manages the control of execution of parts from management of an edit state and a selected area and empty space management 203 to data deletion 215. Details of the device data analysis unit 202 will be described later mainly focusing on FIG. 19 that is a state transition diagram of the token and pen vector analysis processing.

The empty space management unit 203 conducts in-use space management and empty space management in a two-dimensional coordinate space that defines two-dimensional coordinate positions described above, when the above-mentioned digital pen is used. At least a two-dimensional coordinate space registered in the rectangular area in the coordinate conversion management table (to be described later) in FIG. 10 of this embodiment is managed as an in-use area described above in the empty space management unit 203. However, when the tablet is used, the empty space management unit 203 is not used.

A coordinate conversion management unit 204 manages data written in the coordinate conversion management table in FIG. 2, and manages each hatched rectangular area in FIG. 5 by associating an area ID, area calcification, an alternate token, an area correspondence processing object, and a comment for each area. Details will be described later using FIG. 21.

Details of the coordinate conversion management table in FIG. 10 will be described here. The area ID column is for an ID for identifying a rectangular area. The rectangular area column is for information on the above-mentioned edit area that is a hatched area in FIG. 5 and an area for the mode button 513, the function buttons 514, and a transmission button 516. For example, in a system using a digital pen, FIG. 5 shows a form paper for editing, and information that indicates a set of IDs corresponding to a dot pattern representing two-dimensional coordinates printed in each rectangular area. However, in the system using the digital pen, the transmission button 516 is special and is used to trigger transmission of handwriting data of a digital pen stored in the digital pen to the edit command processing unit 301 of this embodiment. For example, information indicating a set of IDs consisting of two-dimensional coordinates of the upper left corner, the upper right corner, the lower left corner and the lower right corner.

On the other hand, in the system using a tablet, information indicating a set of IDs of a rectangular area column is two-dimensional area information of a screen of each rectangular area hatched on the screen for image editing in FIG. 5 that is displayed on the display device of the tablet. For example, the two-dimensional area information is two-dimensional coordinates of the upper left corner, the upper right corner, the lower left corner, and the lower right corner on a virtual display screen.

An area classification column is information whereby whether an area is an editing area or a button for specifying a mode or for specifying a function is identified.

An alternate token is a token that substitutes a set: a series of and a plurality of two-dimensional coordinates as one token and that abstracts meaning of buttons among the buttons 513, 514 shown in FIG. 5, and is used to simplify internal analysis processing. The reason is that the processing system is complicated by checking an area range one by one for a series of and a plurality of two-dimensional coordinates entered from the pointing device to find corresponding meaning for each coordinate. When the inside of the rectangular area in each of the buttons 513,514 shown in FIG. 5 is checked with the pointing device, such as a pen, a coordinate conversion management table of FIG. 10 is referred to using coordinate information received from the pointing device as a key. Thereby, a button in each of the buttons 513,514 is converted into an alternate token. Conversion to an alternate token is done in a preceding stage of the device data analysis unit.

Explanation of contents of each alternate token is given below. <T>: A token meaning that any one button in a button area (inside of an area 515 in FIG. 5) is touched with a pen. <FTx>: A token meaning that anyone button in a function button area (inside of reference numeral 514 in FIG. 5) is touched with a pen. "x" of "FTx" is a reference numeral to distinguish each function button. <MT>: A token meaning that any one button in a mode button area (inside of reference numeral 513 in FIG. 5) is touched with a pen. <AT>: A token meaning that a button related to an area (a new area mode, an area selection mode, and an area selection cancellation mode in reference numeral 513 in FIG. 5) is touched with a pen. <IT>: A token meaning that an "handwritten input mode" (inside of reference numeral 513 in FIG. 5) button is touched with the pen. <ST>: A token meaning that an "area selection mode" (inside of reference numeral 513 in FIG. 5) button is touched with the pen. <NT>: A token meaning that a "new area selection mode" (inside of reference numeral 513 in FIG. 5) button is touched with the pen. <CT>: A token meaning that an "area selection cancellation mode" (inside of reference numeral in FIG. 5) button is touched with the pen.

Mutual relations of the above-mentioned tokens are shown below.

$$\langle T \rangle ---+---\langle FT \rangle 1 ---\langle MT \rangle ---+---\langle AT \rangle ---+$$
$$---\langle ST \rangle 1 +---\langle NT \rangle +---\langle IT \rangle ---+---\langle CT \rangle$$

Moreover, processing in an area correspondence processing object column in FIG. 10 is processing that corresponds to each rectangular area. Concretely, information indicating program entry of device data analysis processing in FIG. 2 is stored. A comment for identifying the meaning of an area is stored in a comment column.

A handwritten input mode unit 206, a vector addition unit 207, a new area mode unit 208, an area selection cancellation mode unit 209, and an area selection mode unit 210 in the edit command processing subsystem 200 in FIG. 2 start respective processing units and deliver processing parameters. These actual processing of these processing units is executed by the image data editing subsystems (reference numeral 103 in FIG. 1, reference numeral 302 in FIG. 3, and reference numeral 405 in FIG. 4). Details of contents of processing of the image data edit subsystem will be described later using FIGS. 22 to 26.

Figure 7:
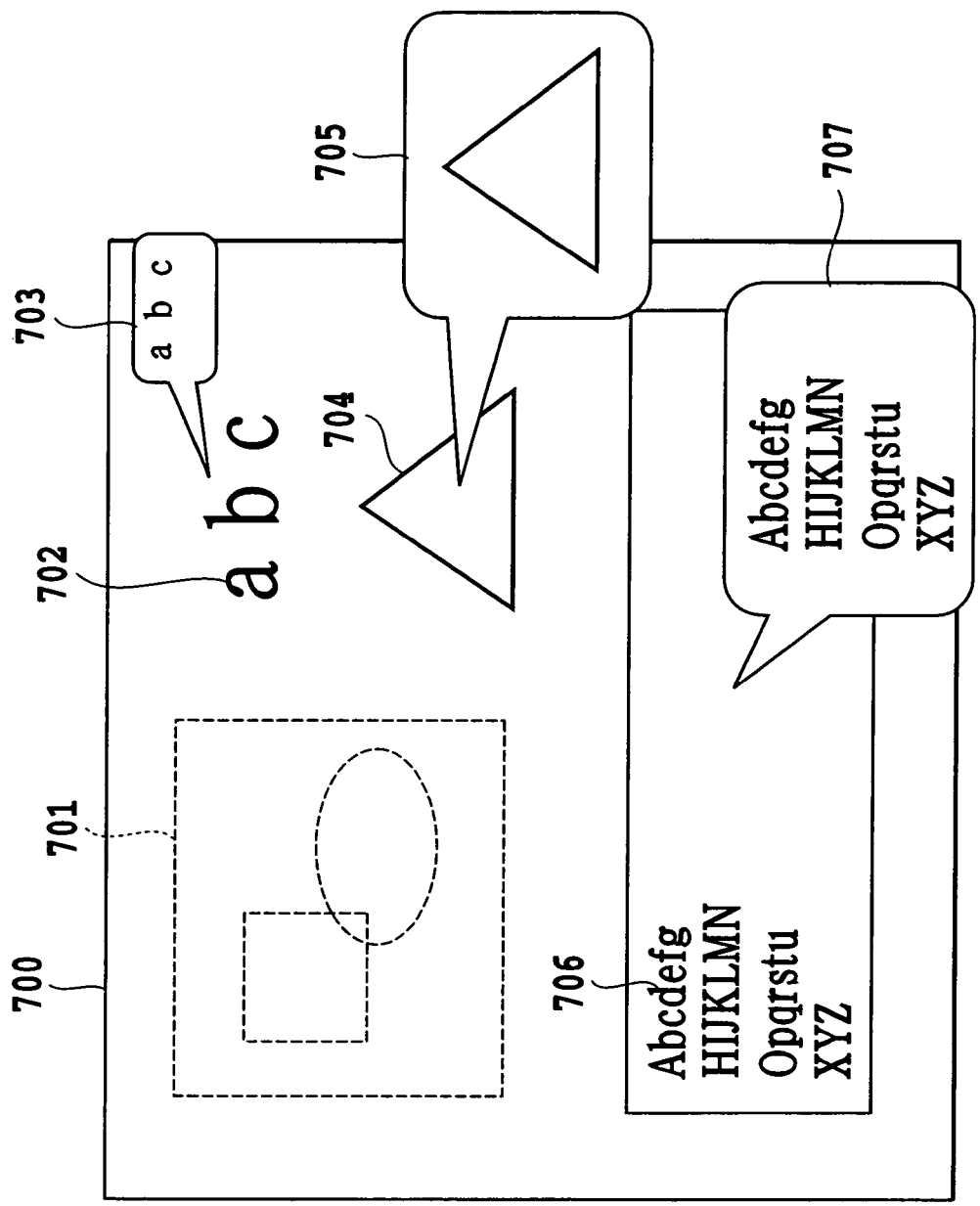
FIG. 7 is a diagram of an edit screen after edit processing of an embodiment to which this invention can be applied.

FIG. 7 is a view of an edit screen 700 after edit processing, which is displayed by the operation panel 101 or the edit clients 300,400. Results of processing of function processing units 211 to 213, and 215 will be described using FIG. 5 and FIG. 7.

The image-to-character code conversion unit 211 extracts a character portion in the image whose area is specified and converts it into a character code. For example, if an area 509 in FIG. 5 is selected and image-to-character code conversion is performed, it is converted to character codes as data 707 in FIG. 7 and embedded as edit data of annotation, and also written as image data of character fonts as shown by reference numeral 706.

A handwriting-to-character code conversion unit 212 converts a handwriting vector by a pointing device, such as a tablet and a digital pen, in an area-specified area into character codes. For example, if an area 506 in FIG. 5 is selected and handwriting-to-character conversion is performed, it is converted to character codes "abc" as shown in reference numeral 703 in FIG. 7 and embedded as edit data of annotation, and also written as image data of character fonts as shown by reference numeral 706.

A graphic form shaping unit 213 graphic-shapes the handwriting vector of the pointing device described above in the area-specified area and converts it into graphic form vector data. For example, if an area 507 in FIG. 5 is selected and subjected to graphic form shaping, a triangle 508 written with the pointing device is shaped as shown by reference numeral 704 in FIG. 7 and written as an image. Furthermore, the graphic form vector data of the triangle that was shaped is embedded in the edit data as annotation.

A trimming/masking unit 214 trims or masks an image in an area-specified area.

The data deletion unit 215 deletes an image in an area-specified area, and replaces it with a default painting-out color or a dot pattern. For example, specification and data deletion of the area 502 in FIG. 5 cause a specified area to be deleted as shown by reference numeral 701 in FIG. 7. The image before deletion may be remained as in a broken line for display's sake, as shown by reference numeral 701, or may be deleted completely for display's sake.

(Explanation of Operation)

In the system configuration described above, the contents of operations of the image will be described.

Details of the device data analysis unit 202 that are features of this embodiment will be described. First, the details will be described using a flowchart of device data analysis processing in FIG. 20. In Step S2001, pen data of one stroke is received from the device communication unit 201. The pen data mentioned here is handwriting data by a pointing device such as a tablet or a digital pen (hereinafter, referred to as "pen" for simplicity).

Next, the device data analysis unit 202 executes coordinate conversion management processing (this will be described later with reference to FIG. 21) of the coordinate conversion management unit 204 in Step S2002. Here, the device data analysis unit 202 converts pen data into a pen vector (PVn) or converts it into an alternate token referring to the coordinate conversion management table in FIG. 10, and selects a processing object corresponding to an area that was written with the pen referring to the coordinate conversion management table in FIG. 10. Next, in Step S2083, the flow check to see whether the processing object is Proc-A that is a processing object for image editing. If the result is NO, then the flow advances to Step S2005 and executes other correspondence processing and terminates it. On the other hand, if the result is YES, then the flow proceeds to Step S2004, executes token and pen vector analysis processing, and terminates it. Incidentally, details of Step S2004 will be described later using FIG. 19.

Figure 21:
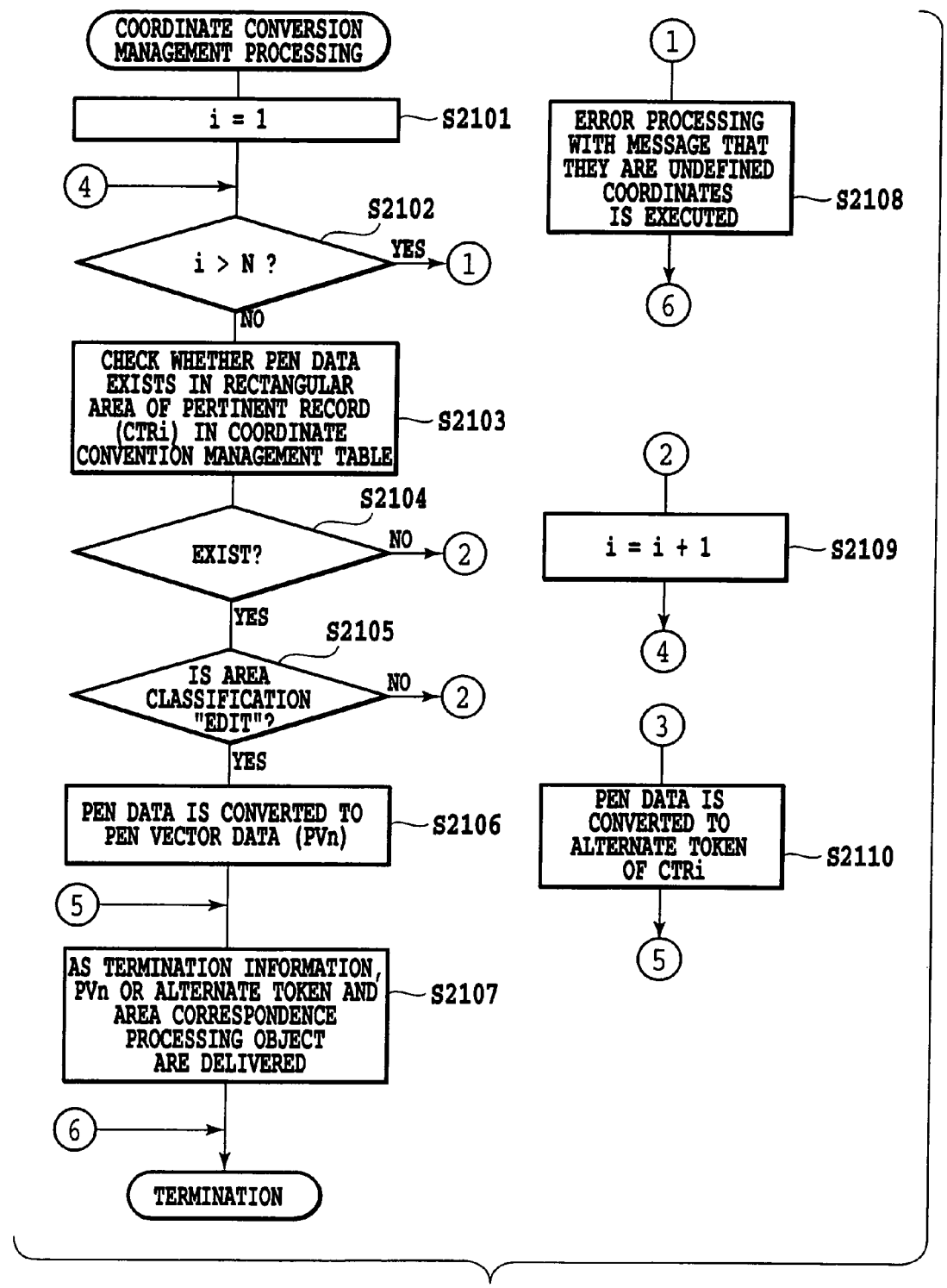
FIG. 21 is a flowchart of coordinate conversion management processing of an embodiment to which this invention can be applied.

Next, processing of the coordinate conversion management unit 204 will be described using FIG. 21. First, in Step S2101, in order to search the coordinate conversion management table in FIG. 10, "i" that is an index variable of the table is set to unity. Next, the flow proceeds to Step S2102 and checks whether all the last records are searched comparing it with N that is a maximum number of records of the table. If "i" exceeds N and all the last records are searched (YES), the flow jumps to Step S2108. If the result is NO, then the flow advances to Step S2103 and checks to see whether the pen data is within a rectangle area of the record (CTRi) indicated by the index variable "i" in the coordinate conversion management table in FIG. 10.

Next, in Step S2104, the flow checks whether a pen vector exists in the rectangular area, and if it does not exist (NO), then the flow jumps to Step S2189. On the other hand, if the result is YES, then the flow advances to Step S2105 and checks whether an area classification indicated by the index variable "i" is "edit." If the result is NO, then flow jumps to Step S2110. On the other hand, if the result is YES, then the flow assumes that the inside of an edit area was written with a pen, advances to Step S2106, converts the pen data into a pen vector (PVn), and stores it in a temporary memory area (temporary storage area).

Figure 20:
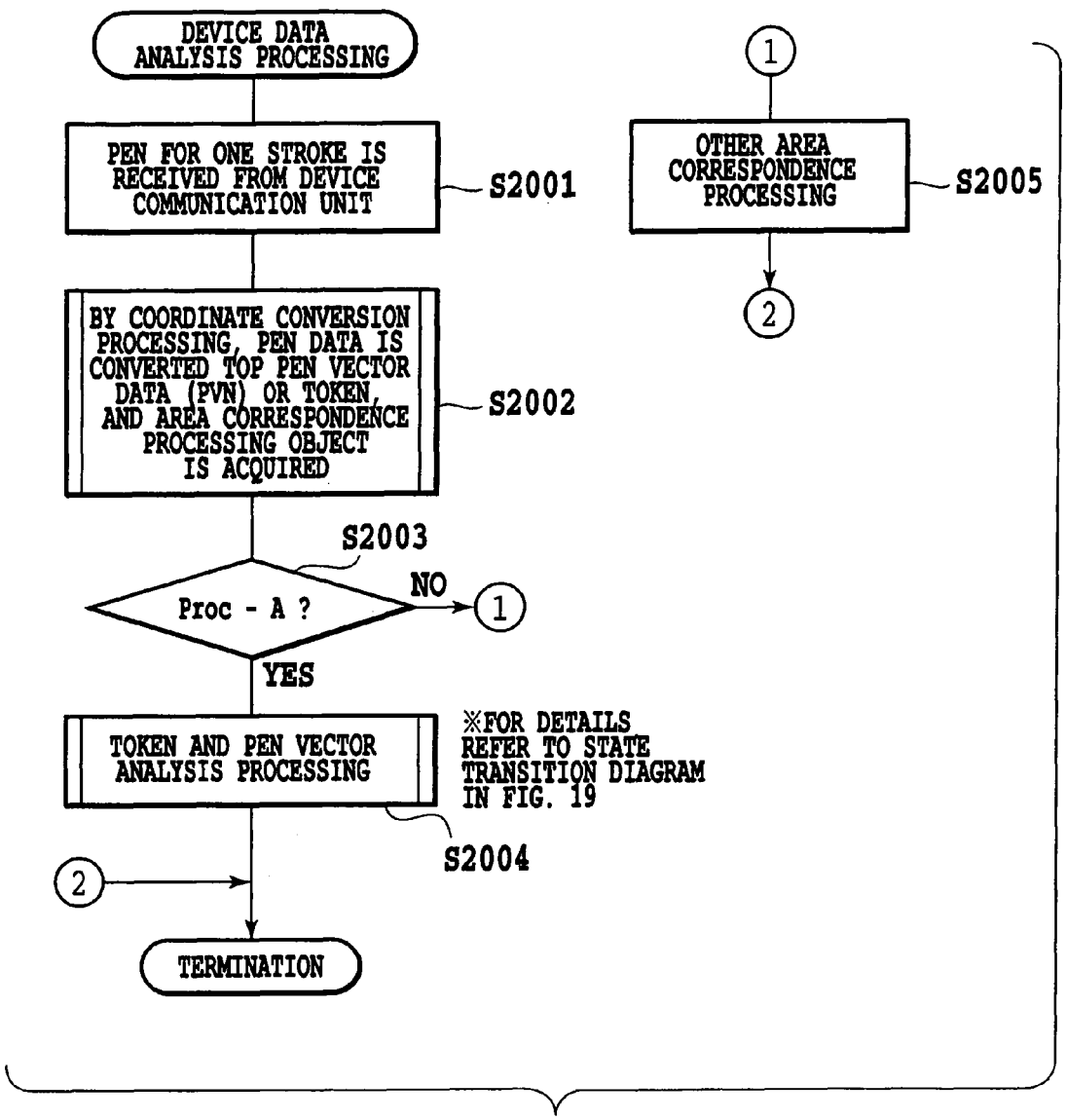
FIG. 20 is a flowchart of device data analysis processing of an embodiment to which this invention can be applied.

Next, the coordinate conversion management unit 204 proceeds to Step S2107, and delivers termination information after completion of the processing to the device data analysis unit 202 to processing in FIG. 20, and terminates the processing. Here, as the termination information, the coordinate conversion management unit 204 delivers a pen vector (PVn) or an alternate token and an area correspondence processing object in a record indicated by the index variable "i" in the coordinate conversion management table in FIG. 10 to the processing in FIG. 20, as parameters.

Furthermore, in Step S2108, the flow displays an error message "the pen data is not registered on the coordinate conversion management table in FIG. 10 and cannot be processed (or message urging the user to conduct writing in the edit area or on buttons)" on the display devices of the operation panel 101 or the edit clients 300, 400. Moreover, in Step S2109, in order to process the next record in the coordinate conversion management table in FIG. 10, the flow increments the index "i" and jumps to Step S2102. Moreover, in Step S2110, since an area written with a pen is a button area described above, the flow takes out an alternate token of the record indicated by the index variable "i" in the coordinate conversion management table in FIG. 10 and jumps to Step S2107 to deliver it as termination information.

Next, details of Step S2004 in FIG. 20 will be described using the state transition diagram of token and pen vector analysis processing in FIG. 19.

The area-not-selected state 1901 indicates a state where no edit target area is selected at all. A state 1 of edit inputting 1905 indicates a state where no area is selected at all and writing is being done inside the edit target area (reference numeral 599 in FIG. 5) using a pointing device. The state of area specified 1908 indicates a state where an edit target area is specified. A state 2 of edit inputting 1911 indicates a state where an edit target area is specified and writing is being done inside the edit target area (reference numeral 599 in FIG. 5) using a pointing device.

Figure 19:
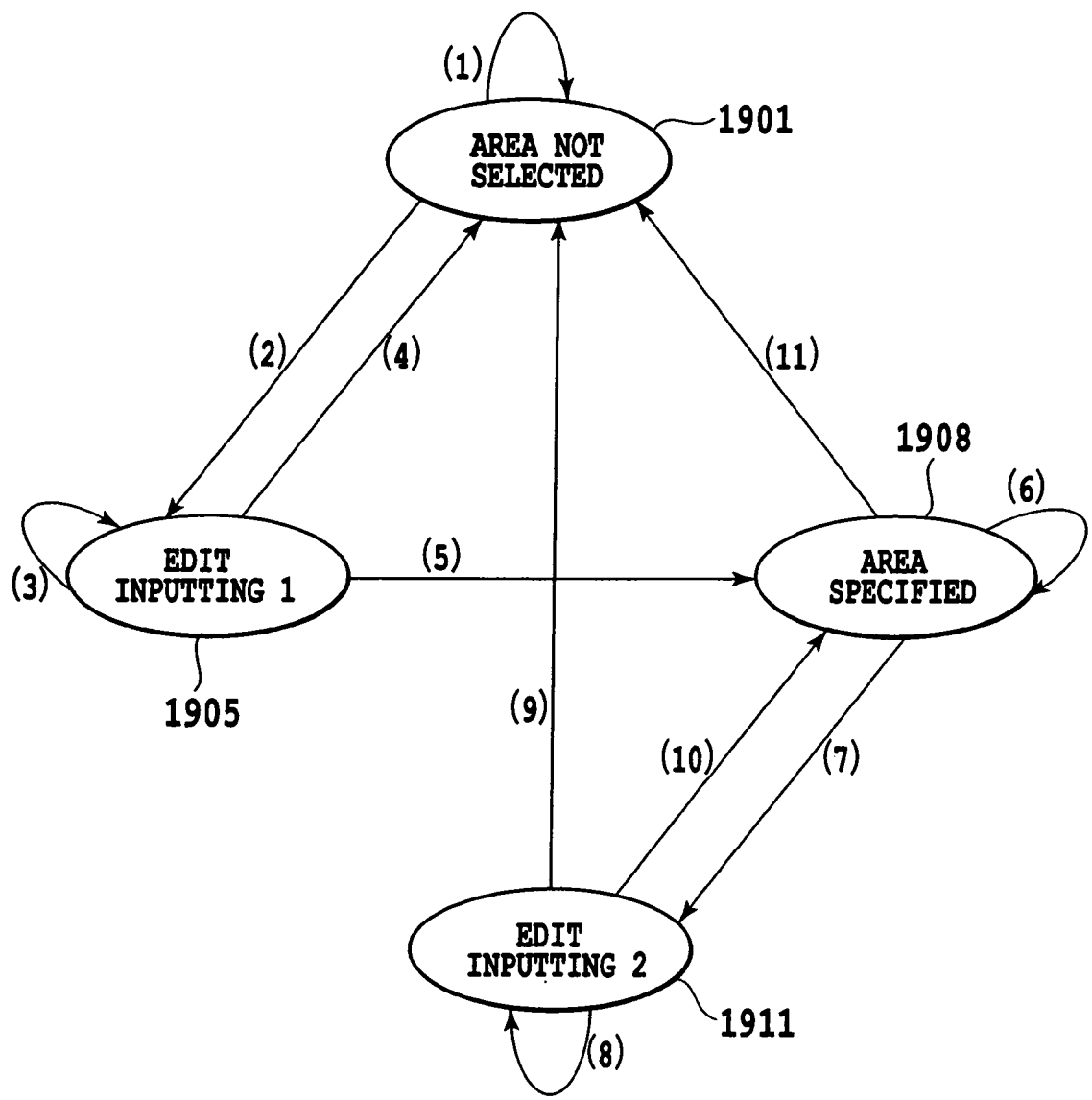
FIG. 19 is a state transition diagram of analysis processing of a token and a pen vector of an embodiment to which this invention can be applied.

The arrow in FIG. 19 shows a transition from a certain state to the next state; a number attached to the arrow shows a number (X or X of X-Y) that is shown in the following IF-THEN expression. An IF-THEN expression accompanying a branch number (X-Y) of the expression indicates that there exist as many IF-THEN expressions as the branch number (T). IF and after is a transition condition, and THEN and after is processing when the flow made transition. Incidentally, the inside of parenthesis "< >" represents the alternate token (see the explanation of the above-mentioned coordinate conversion management unit 204). Furthermore, PVn represents a pen vector that is data of handwriting written inside the edit target area (reference numeral 599 in FIG. 5).

<<IF-THEN Expressions>>

(1) IF <T> THEN notify the user of an error.
(2) IF PVn THEN execute vector addition processing.
(3)-1 IF PVn THEN execute vector addition processing.
(3)-2 IF <FT> THEN notify the user of an error.
(4)-1 IF <CT> THEN ignore PVn in front of <CT> and <CT>.
(4)-2 IF <IT> THEN execute the handwritten input mode on PVn in front of <IT>.
(5)-1 IF <ST> THEN execute the area selection mode processing on PVn in front of <ST>.
(5)-2 IF <NT> THEN execute the new area mode processing on PVn in front of <NT>.
(6) IF <IT>, <ST>, or <NT> THEN notify the user of an error.
(7) IF PVn THEN execute vector addition processing.
(8)-1 IF PVn THEN execute vector addition processing.
(8)-2 IF <FT> THEN notify the user of an error.
(8)-3 IF <CT> THEN execute the area selection cancellation mode processing on PVn in front of <CT>.
(9) IF <CT> THEN execute the area selection cancellation mode processing on PVn in front of <CT>.
(10)-1 IF <ST> THEN execute the area selection mode processing on PVn in front of <ST>.
(10)-2 IF <NT> THEN execute new area mode processing on PVn in front of <NT>.
(10)-3 IF <IT> THEN execute the handwritten input mode processing on PVn in front of <IT>.
(11)-1 IF <FT> THEN execute various functional processing on a selected area.
(11)-2 IF <CT> THEN execute the area selection cancellation mode processing on a selected area.

Hereafter, details of the underlined parts of processing units described after THEN of the above-mentioned IF-THEN expression will be described using FIG. 2 and flowcharts in FIGS. 22 to 26. Here, antecedent to the explanation of the details, first, a list diagram of the data object management table in FIG. 8 will be described, and description related to the edit area management tables of FIGS. 11 to 18 will be given further.

The data object management table for managing data of handwriting other than area-related handwriting written in the edit target area 599 in FIG. 5 will be described with reference to a list diagram of the data object management table in FIG. 8.

In FIG. 8, the data object management table manages a set of the pen-inputted data that is data of handwriting to be edited as a management unit. Concretely, one management record is used to manage a set of pen-inputted data inputted until a function button in reference numeral 514 in FIG. 5 is selected. The pen-inputted data is stored in the "Pen-inputted data" column of the management record in the data object management table. "Data classification" and "contents of data" columns store data classification corresponding to a function button that is selected and conversion processing results of the pen vector PVn to be edited corresponding to that selection button, respectively.

For example, regarding an object ID "0a" in the first record in FIG. 8, a function button "Handwriting-to-character string conversion" in reference numeral 514 in FIG. 5 is applied, and "character string" and "abc" 703 that is a character string are stored in the "Data classification" column and "Data contents" column, respectively.

Regarding an object ID "0b," a function button "Graphic form conversion" in reference numeral 514 in FIG. 5 is applied to a pen vector in the area 508 in FIG. 5, and "graphic form shaping" and a graphic form vector of a triangle 705 are stored in the a "Data classification" column and "Data contents" column, respectively.

Regarding an object ID "0c," a function button "Image-to-character string conversion" in reference numeral 514 in FIG. 5 is applied to a pen vector in the area 509 in FIG. 5, and a "characterstring" and the character string 707 that is a result of the conversion are stored in the "Data classification" column and "Data contents" column, respectively. However, since an object 512 in FIG. 5 is a character string of image data, the pen vector is not stored in the "Pen-inputted data" column.

Figure 9:
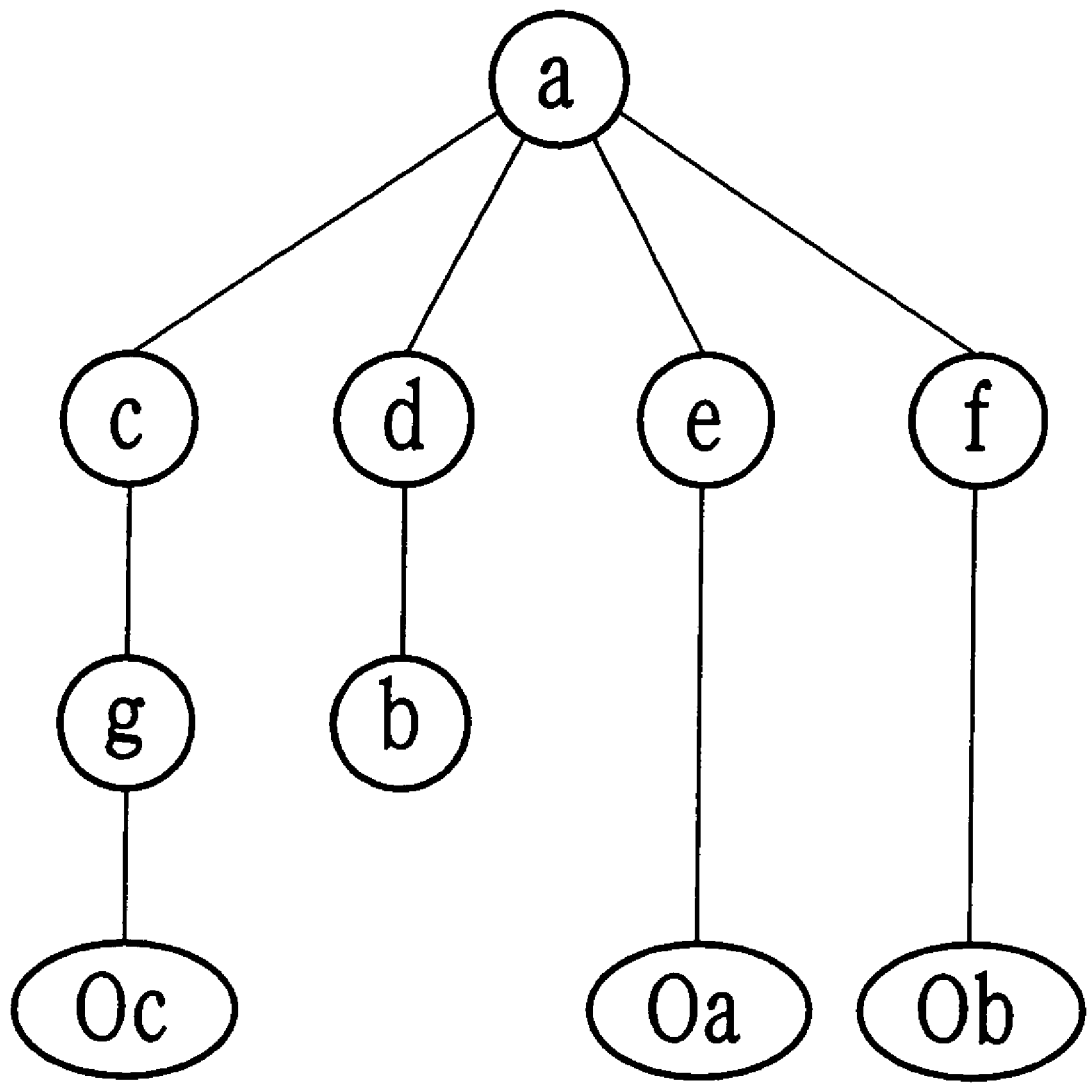
FIG. 9 is a tree diagram showing a mutual relation of data objects of an embodiment to which this invention can be applied.

Next, contents of a setting of the edit area management table in FIGS. 11 to 18 will be described with reference to FIG. 5, FIG. 8, and FIG. 9.

FIG. 11 is an initial state and an edit target area 599 in FIG. 5 is in the first line (first management record) in the management table in FIG. 11, which contains "b" ("Area ID" in the second line of the management table) and "c" ("Area ID" in the third line of the management table) as "Included area." The second line of the management table is a management record of the rectangle 503 in FIG. 5, and the third line is a management record of a rectangular area 510 in FIG. 5. Analysis of the rectangle 503, 510 and extraction of rectangles from image data are processed in the image processing subsystem 105 in FIG. 1, an image processing subsystem in reference numeral 305 in FIG. 31, and an image processing subsystem in reference numeral 402 in FIG. 4, and the results will be reflected in the management records in the second and third lines in FIG. 11.

FIG. 12 shows a state of the edit area management table immediately after an enclosure line of first new area specification (the area 502 in FIG. 5) was written with a pen following the initial state of FIG. 11. As a result, a fourth management record ("Area ID" is "d") in FIG. 12 is added, and "selected," "handwriting area," and the rectangle 504 data expressed with a broken line in FIG. 5 that circumscribes the area are set in "Selection state," "Classification," and "Area vector," respectively. Moreover, since the area 502 includes the rectangle 503, "b" is set in "Included area." Furthermore, "Included area" of the first management record "a" in FIG. 12 is set to "c" and "d."

FIG. 13 shows an edit area management table immediately after characters "abc" in reference numeral 505 in FIG. 5 were written with the pen. A pen vector of these characters is set in "Pen-inputted data" of the management record (the first line in FIG. 8) added newly to the data object management table in FIG. 8, and "0a" is set in "Object ID." Next, "0a" is set as "Included object" of the first management record in FIG. 13.

FIG. 14 shows a state of the edit area management table immediately after the surrounding of the characters in reference numeral 505 in FIG. 5 that were written with the pen was specified as an area with the area 506. Operationally, a new area mode button is checked in reference numeral 513 immediately after the area 506 was written with the pen. The area 506 is newly specified just below the edit target area 599. Consequently, a fifth record in FIG. 14 is added, and the following settings are done: "Area ID" is set to "e"; "Selection state" to "selection"; "Classification" to "handwriting area"; "Area vector" to a circumscribed rectangle in the area 506; "Inclusion area" to "none"; and "Included object" to "0a." Moreover, "e" is added to "Included area" in the first line in FIG. 14 and "Included area" is set to "none." This setting is done because a state where the edit target area 599 includes the object "0a" directly is changed to a configuration where the new area "e" includes the object "0a" directly and the edit target area 599 include the area "e."

FIG. 15 shows a state of the edit area management table immediately after the graphic form 508 in FIG. 5 is written with the pen. A pen vector of the characters is given to "Pen-inputted data" of the management record (the second line in FIG. 8) added newly to the data object management table in FIG. 8, and "Object ID" is set to "0b." Next, "0b" is set as "Included object" of a first management record in FIG. 15.

FIG. 16 shows a state of the edit area management table immediately after the area 507 was written in the surrounding of the graphic form 508 in FIG. 5 with the pen, and a new area was specified. Operationally, after writing the area 507 with a pen, the user checks the new area mode button in reference numeral 513. The new area 507 is newly specified just below the edit target area 599. Consequently, a sixth management record in FIG. 16 is added, and "Area ID" is set to "f," "Selection state" to "selection," "Classification" to "handwriting," "Area vector" to a circumscribed rectangle in the area 507, "Included area" to "none," and "Includes object" to "0b." Moreover, "Included area" on the first line in FIG. 16 is set to "f" additionally, and "Included object" is set to "none." This settings are done because a state where the edit target area 599 includes the object "0b" directly changes to a configuration where the new area "f" includes the object "0b" directly and the area target area 599 includes the area "f."

Next, FIG. 17 shows a state of the edit area management table immediately after a new area was specified by writing the area 509 around the sentence 512 in FIG. 5. As a result, a seventh management record ("Area ID" is "g") in FIG. 17 is added, "Selection state" is set to "selection," "Classification" is set to "handwriting area," and data of an unillustrated rectangle circumscribing the area is set to "area vector." Moreover, since the rectangular area 510 includes the area 509, "Included area" having a third management record "c" in FIG. 17 is set to "g."

Finally, FIG. 18 shows a state of the edit area management table immediately after performing "Image-to-character string conversion" in the function button area 514 for an image in the area 509. The character string that is a result of this conversion is set as a management record in the third line of the data object management table in FIG. 8. "Selection state" is set to "unselected" in a seventh line ("Area ID" is "g") in FIG. 18, "Included object" is set to "0c" in the third line in FIG. 8. The tree diagram showing a mutual relation of the data objects in FIG. 9 shows relations between objects and areas in FIG. 18.

Figure 23:
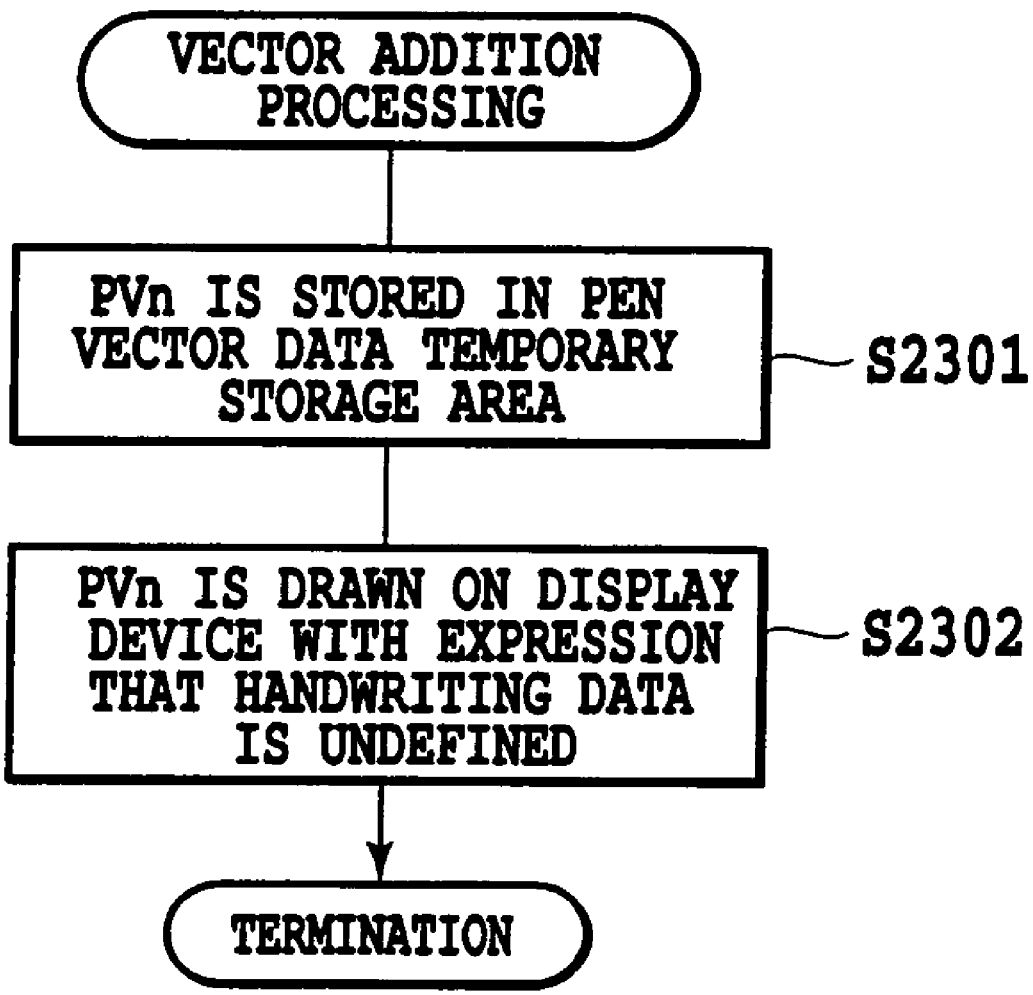
FIG. 23 is a flowchart of vector addition processing of an embodiment to which this invention can be applied.

Next, the vector addition processing 207 will be described using a flowchart of vector addition processing in FIG. 23. In Step S2301, the pen vector data (PVn) is stored in the temporary storage area of the above-mentioned pen vector. Next, the flow proceeds to Step S2302, a pen vector (PVn) is displayed on the display device by a representation that its handwritten data is neither a selected area nor a handwritten object to be edited but an undetermined state (for example, if the display device is a color display, it is a green line; if being a black-and-white display, it is a broken line).

Figure 22:
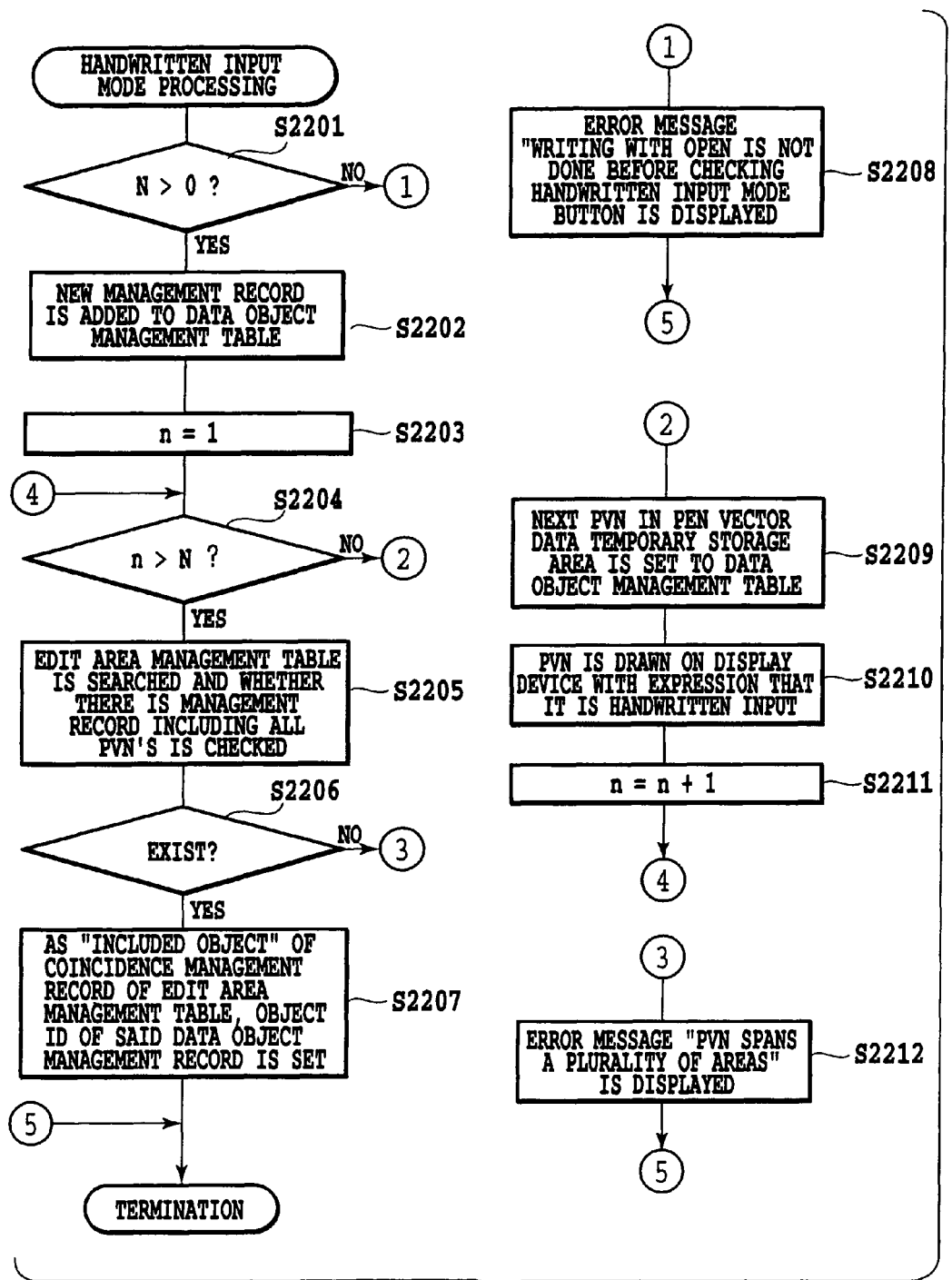
FIG. 22 is a flowchart of handwritten input mode processing of an embodiment to which this invention can be applied.

Next, the handwritten input mode unit 206 will be described in detail using a flowchart of handwritten input mode processing in FIG. 22. First, N in Step S2201 is the number of pen vectors inputted before checking the handwritten input mode button in FIG. 5. In the case of N=0, it means that no vector is inputted at all. Therefore, in Step S2201, if the flow checks the N to find that N is equal to or less than 0, then the flow jumps to Step S2208 and display an error message accordingly on the display device (display device of the operation panel subsystem 101 in FIG. 1 and display devices of the image edit clients 300, 400).

On the other hand, if the result is N>0, then the flow proceeds to Step S2202 and adds a record newly to the data object management table in FIG. 8. Next, the flow proceeds to Step S2203, and sets a variable "n" that counts the number of pen vectors fetched from the temporary storage area of pen vector to unity. Next, the flow proceeds to Step S2204 and checks whether n>N holds (this means that the last pen vector is taken out), and if the result is NO, then the flow jumps to Step S2209.

On the other hand, if the result is YES, then the flow proceeds to Step S2205, searches the above-mentioned edit area management table, and checks whether there is a management record that includes all the pen vectors fetched from the temporary storage area (Step S2206). If such a management record does not exist, the flow jumps to Step S2212. On the other hand, if such a management record exists, the flow advances to Step S2207, sets the object ID of the above-mentioned data object management table as "Included object" of the management record of the edit area management table that obtained coincidence in Step S2205, and terminates the processing.

In Step S2208, the flow conducts error indication that "nothing is written before checking the handwritten input mode button" on the display device described above and terminates the processing.

In Step S2209, the flow sets a next pen vector (PVn) in the temporary storage area of the pen vector data in the management record of the data object that was added in Step S2202. Next, the flow proceeds to Step S2210 and indicates the pen vector by a representation that it is handwriting of handwritten input on the display device described above (for example, if the display device is a color display, the expression is a blue line; if being a black-and-white display, the expression is a solid line). Next, in Step S2211, the flow increments "n" that indicates the pen vector (PVn) and jumps to Step S2204.

In Step S2212, the flow displays an error message "the pen vector spans a plurality of areas" on the display device described above and terminates the processing.

Figure 25:
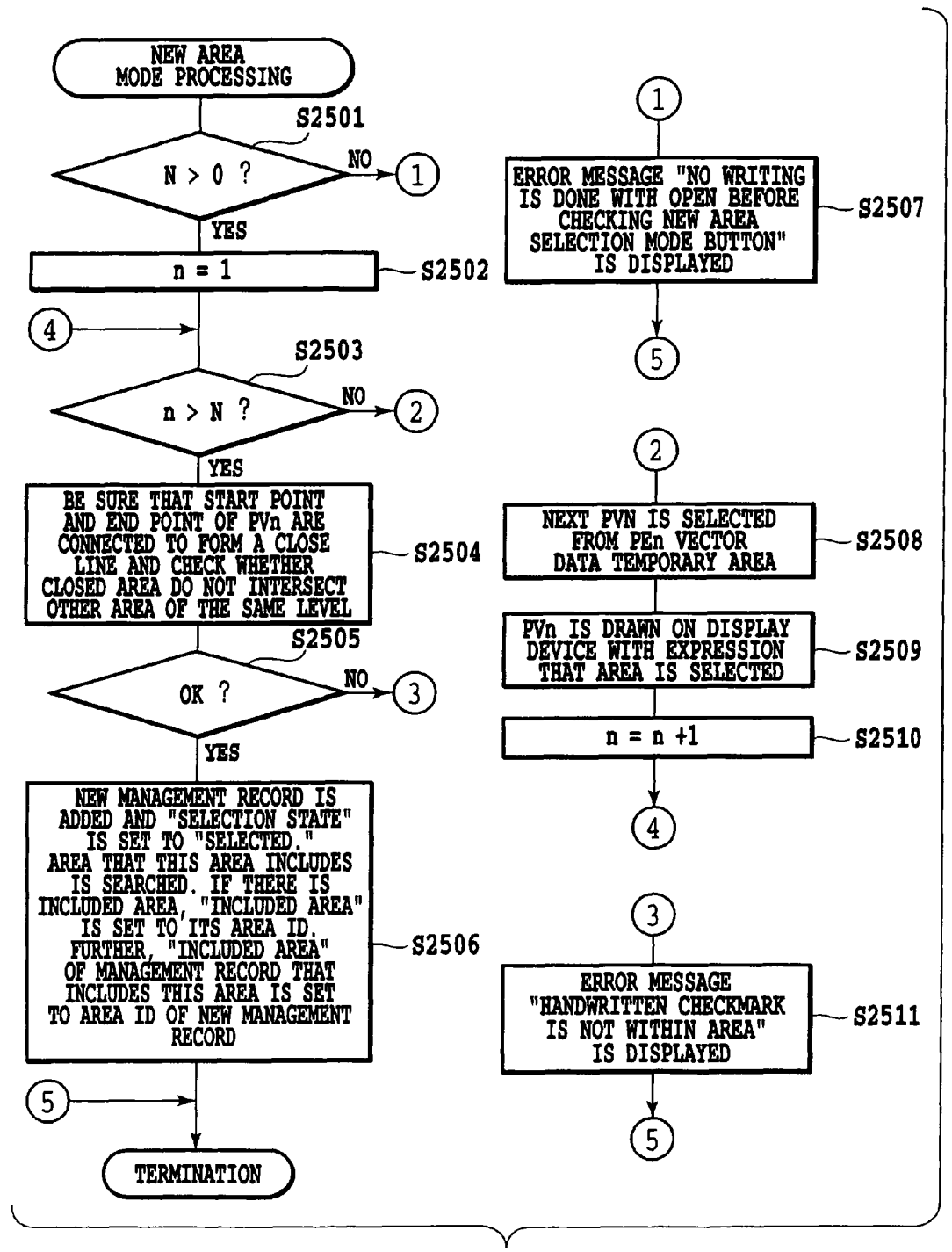
FIG. 25 is a flowchart of new area mode processing of an embodiment to which this invention can be applied.

Next, the new area mode unit 208 will be described using the flowchart of the new area mode processing in FIG. 25. First, in Step S2501, the flow checks to see whether N>0 holds and checks to be sure whether the number of inputted pen vectors exceeds zero. IF the result is NO, the flows jumps to Step S2507.

On the other hand, if the check result in Step S2501 is YES, the flow proceeds to Step S2502 and sets a variable "n" that specifies n-th pen vector (PVn) inputted before checking the new area mode button to unity. Next, the flow proceeds to Step S2503, checks to see whether n>N holds, and checks to be sure whether processing of all the pen vectors (PVn) have been completed. If not being completed (NO), the flow jumps to Step S2508.

On the other hand, if being completed (YES), the flow in the new area mode unit 208 advances to Step S2504. Here, the new area mode unit 208 checks to be sure whether an area line specifying the new area crosses a line segment of a starting pint and an end point of a pen vector (PVn) or whether the line segment is within a range of predetermined distance and crosses an area line of other area of the same level. The above-mentioned level is, for example, levels c, d, e, f and levels g, b in the tree diagram that shows mutual relations of data objects in FIG. 9. The result is checked in Step S2505: if it is not OK, then the flow jumps to Step S2511.

On the other hand, if the check result is OK in Step S2505, the flow proceeds to Step S2506, where the flow adds a new management record in the above-mentioned edit area management table and sets "Selection state" of the management record to "selected." Furthermore, in order to check to see whether there exists an area that includes the new area, the above-mentioned edit area management table is searched: if there exists an area that includes the new area, the area ID is set to "Included area" of the new management record. Furthermore, the area ID of the new management record is set to "Included area" of the management record of the area that includes the new area.

In Step S2507, the flow displays an error message "writing has not been done with the pen before the new area mode button is checked" on display devices of the operation panel subsystem 101 and the edit clients 300, 400.

In Step S2508, the flow takes out a next pen vector (PVn) from the temporary storage area of pen vector data as a target of processing. Next, the flow advances to Step S2509, where the flow indicates the enclosure line of the edit target area by an expression to notify that the area is selected to the user on the display devices of the operation panel subsystem 101 and the edit clients 300, 400. Here, for example, the above-mentioned expression is a red line, if the display device is a color display; it is a broken line consisting of long and short segments, if the display device is a black-and-white display. Then the flow proceeds to Step S2510, increments the variable "n," and jumps to Step S2503.

In Step S2511, the flow displays an error massage that "a check mark hand written on display devices of the operation panel subsystem 101 and the edit clients 300, 400 is not within an area," and comes to error termination.

Figure 24:
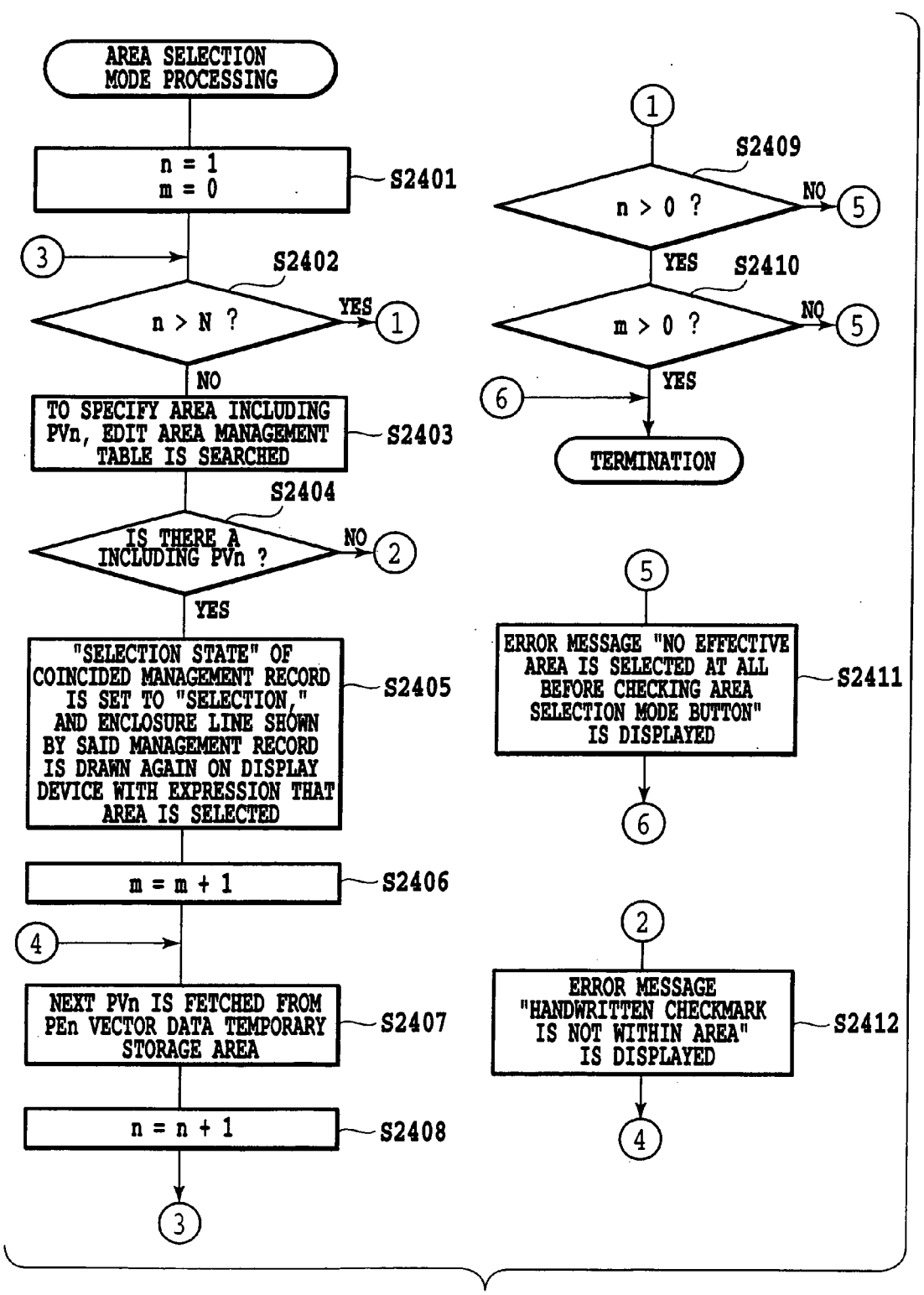
FIG. 24 is a flowchart of area selection mode processing of an embodiment to which this invention can be applied.

Next, the area selection mode unit 210 will be described using a flowchart of area selection mode processing in FIG. 24. First, in Step S2401, the flow sets a variable "n" that specifies n-th pen vector (PVn) inputted before checking the area selection mode button to unity, and sets a variable "m" that counts how many edit target areas are selected to zero. Next, the flow proceeds to Step S2402, and checks whether n>N holds (N: the number of pen vectors (PVn) inputted before the area selection mode button is checked) to check to see whether the pen vector is a last pen vector. If the result of check is YES, then the flow jumps to Step S2409.

On the other hand, if the result is NO, then the flow proceeds to Step S2403 and searches an area vector column of the edit are management table in FIGS. 11 to 18. If the is no such a record, then the flow jumps to Step S2412. On the other hand, if there is such a record, the flow proceeds to Step S2405, and sets the above-mentioned edit area management record that includes a pen vector (PVn) to a "selected" state in order to indicate that the area is in a selected state. In this occasion, the flow shows an enclosure line of the edit target area by an expression to inform the user that the area is selected (for example, if the display device is a color display, the expression is a red line; if being a black-and-white display, a broken line consisting of long and short broken lines) on display devices of the operation panel subsystem 101 and the edit clients 300, 400.

Next, the flow proceeds to Step S2406, and increment a variable "m" that is a counter for the number of areas that are selected. Next, the flow proceeds to Step S2407, where the flow takes out the next pen vector (PVn) from the temporary storage area of pen vector data. In Step S2408, the flow increments a variable "n" that specifies an n-th pen vector (PVn) and jumps to Step S2402.

In Step S2409, the flow checks whether N>0 holds (N: the number of pen vectors (PVn) inputted before checking the area selection mode button) to check to see whether the number of inputted pen vectors exceeds zero. If the result is NO, then the flow jumps to Step S2411. On the other hand, if the result of Step S2409 is YES, then the flow checks whether m>0 holds (Step S2410) to check to see whether a selected area exists. IF the result is NO, then the flow jumps to Step 2411. On the other hand, if the result of Step S2410 is YES, then the flow does normal termination.

In Step S2411, the flow displays an error massage that "an effective area was not selected at all before checking an area selection mode button" on display devices of the operation panel subsystem 101 and the edit clients 300, 400, and comes to error termination.

In Step S2412, the flow displays a message "the checked areas are not within one area because handwritten check marks indicate two areas etc." on display devices of the operation panel subsystem 101 and the edit clients 300, 400, and jumps to Step S2407.

Figure 26:
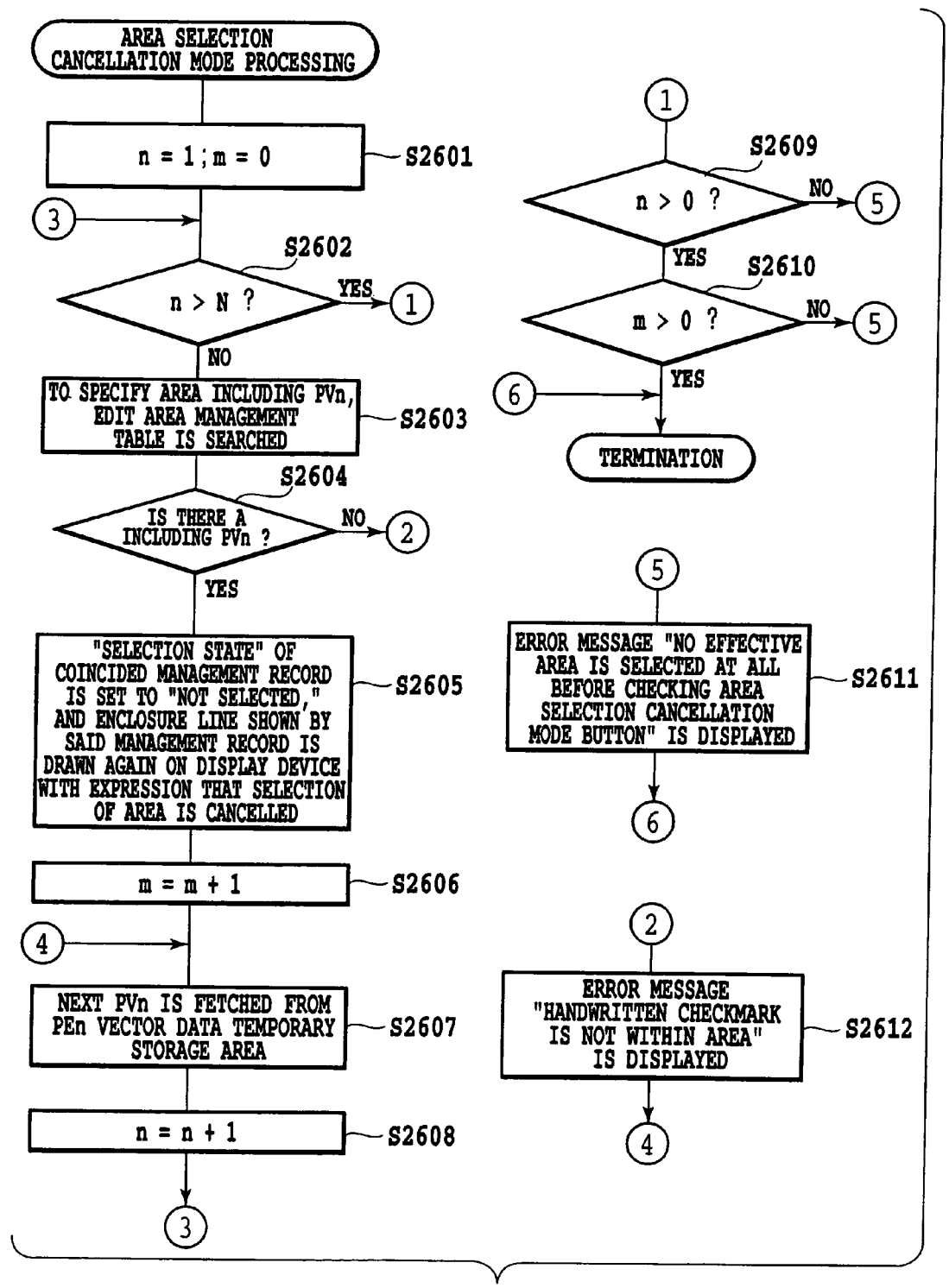
FIG. 26 is a flowchart of area selection cancellation mode processing of an embodiment to which this invention can be applied.

Next, the area selection cancellation mode unit 209 will be described using a flowchart of area selection cancellation mode processing in FIG. 26. First, in Step S2601, the variable "n" that specifies the n-th pen vector (PVn) inputted before checking an area selection cancellation mode button is set to unity, and the variable "m" that counts how many edit target areas were selected is set to zero. Next, the flow proceeds to Step S2602, and checks whether n>N holds (N: the number of pen vectors (PVn) inputted before checking the area selection cancellation mode button) to check to see whether a pen vector to be processed is a last pen vector. IF the result is YES, then the flow jumps to Step S2809.

On the other hand, if the result of Step S2602 is NO, then the flow searches an area vector column of the edit area management table in FIGS. 11 to 18 to check whether there is a management record that includes the pen vector (PVn). If there is no such a management record, then the flow jumps to Step S2612. On the other hand, if there is such a management record, the flow proceeds to Step S2605, and sets the selection state column of the above-mentioned edit area management record that includes a pen vector (PVn) to an "unselected" state in order to indicate that the area is an unselected area. In this occasion, the flow shows an enclosure line of the edit target area by an expression to inform the user that the selection of an area is cancelled (for example, if the display device is a color display, the expression is a gray line; if being a black-and-white display, a thin broken line) on display devices of the operation panel subsystem 101 and the edit clients 300, 400.

Next, the flow proceeds to Step S2606 and increments the variable "m" that is a counter of the number of selected areas. Next, the flow proceeds to Step S2607 and fetches the next pen vector (PVn) from the temporary storage area of pen vector. In Step S2608, the flow increments the variable "n" that specifies an n-th pen vector (PVn) and jumps to Step S2602.

In Step S2609, the flow checks whether N>0 holds (N: the number of pen vectors inputted before checking the area selection cancellation mode button) to check to see whether the number of inputted pen vectors exceeds zero. IF the result is NO, then the flow jumps to Step S2611. On the other hand, in Step S2609, if the result is YES, then the flow checks whether m>0 stands to check to see whether there exists a selected area (Step S2610). If the result of Step S2610 is NO, then the flow jumps to Step S2611; if the result is YES, then the flow comes to normal termination.

In Step S2611, the flow displays an error message "no effective area was selected at all before checking an area selection cancellation mode button" on display devices of the operation panel subsystem 101 and the edit clients 300, 400 and comes to error termination.

In Step S2612, the flow displays a message "the check mark handwritten is not in an area, such as spanning two areas, on display devices of the operation panel subsystem 101 and the edit clients 300, 400," and jumps to Step S2607.

(Effects of the Embodiments)

As described above, according to this embodiment, the image editing system reads a manuscript with scanner means, stores the read image data in image data storage means, and, in specifying an edit target area in order to edit the image data, displays the image data and an area that allows the user to select an edit function for the image data on a display medium, wherein a position indicated by a pointing device on the display medium corresponds to a position in the image data. This image editing system selects one or a plurality of new edit target areas by the user enclosing the edit target areas with a line using the pointing device. When selecting the edit target area, the user checks at least a part of the edit target area of the image data scanned by a scanner or the inside of a newly specified edit area with a pointing device, whereby the image editing system selects the one or the plurality of edit target areas again. Moreover, the image editing system cancels selection of the one or the plurality of edit target area that the user selected by checking the inside of an edit target area that was specified and selected or not yet selected with a pointing device. Moreover, the image editing system allows the user to select one function among at least one or a plurality of edit functions with the pointing device and applies the function to an object included in one or a plurality of edit target areas that were selected.

Therefore, this system has no necessity of enclosing again the edit area that was already processed using the pen to specify and select the edit area as in a handwritten input device of Japanese Patent Application Laid-open No. 6-332611 (1994). Thereby, it becomes possible to select an edit target area only by touching the inside of an edit target area with a pen or by writing a check mark, which improves operability remarkably.

Moreover, compared with the system that performs editing with a marker pen like an image editing device of Japanese Patent Application Laid-open No. 7-58938 (1995), it becomes unnecessary to scan temporary output paper after the user wrote markers on the temporary output paper using a maker pen, which improves operability remarkably. Furthermore, in the editing system with a marker pen of the Japanese Patent Application Laid-open No. 7-58938 (1995), it is necessary to print and scan temporary output paper each time the same manuscript is edited again, and whenever it is done, the quality of image degrades. On the other hand, in this embodiment, not only printing and scanning of temporary output paper becomes unnecessary but also a manuscript needs to be scanned only one time (the first scanning), and consequently degradation in image quality is improved remarkably.

Moreover, since this embodiment allows the user to edit image data scanned by a scanner and select target processing on an object that was already written with a pen, which is different from Notepad disclosed in International Publication Number WO 01-16691, functionality and operability are improved considerably.

Other Embodiments

The embodiment to which this investigation can be applied has its modifications, whose examples are as follows. A storage medium (or recording medium) that stores a program code of software of realizing the functions of the above embodiment. In this case, it goes without saying that the embodiment described above is attained also by a computer (or CPU or MPU (Micro Processing Unit)) of the system or device reading a program code stored in a storage medium.

In this case, since the program code itself read from the storage medium will realize the functions of the above-mentioned embodiment, the storage medium that stores the program code will constitute this invention. Moreover, being not limited to a method where the embodiment is realized by a computer executing a read program, an operating system (OS) working on the computer or other software may execute a part of or the whole actual processing based on instructions of the program code. It is needless to say that a configuration of this invention includes the case where the functions of the embodiment are realized by that processing.

Furthermore, the program code read from the storage medium is written in a function expansion card inserted into the computer or a storage medium installed in a function expansion unit connected to the computer. After that, based on instructions of the program code, a CPU etc. provided in the function expansion card or the function expansion unit may perform a part of or the whole actual processing. It is needless to say that a case where the above-mentioned functions of the embodiment are attained by that processing is included in configurations of this invention.

Moreover, in this invention, a program code of software that realizes the functions of the embodiment may be stored in storage means, such as a hard disk and memory of a system or device, or storage media, such as CD-RW (CD-ReWritable) and CD-R(CD-Recordable). It is natural that the embodiment is attained by a computer of the system or the device (or CPU and MPU) reading and executing a program code that is stored in the storage means and the recording means.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

This application claims priority from Japanese Patent Application No. 2004-194892 filed Jun. 30, 2004, which is hereby incorporated by reference herein.

What is claimed is:

1. An image editing device, comprising:
    an area selection unit for selecting, in a new area mode, an edit area of an image by surrounding the edit area with a frame;
    an extraction unit for extracting a rectangular area originally included in the image;
    a storing unit for storing, for each area which is an edit area selected by said area selection unit or a rectangular area extracted by said extraction unit, in an edit area management table,
        a first item that indicates an area vector,
        a second item that indicates whether the area is selected or not,
        a third item that indicates whether the area is an edit area or a rectangular area,
        a fourth item that indicates information regarding other edit areas and rectangular areas which are contained in the area, and
        a fifth item that indicates information regarding objects which are handwritten into the area and become part of the image;
    a cancellation unit for cancelling, in an area selection cancellation mode, a selection of the edit area or the rectangular area; and
    an area re-selection unit for re-selecting, in an area selection mode, the edit area or the rectangular area by designating one of the objects once in the edit area or the rectangular area and retrieving the area vector of the edit area or the area vector of the rectangular area stored in the edit area management table based on object information regarding the designated object, after cancelling the selection of the edit area or the rectangular area by said cancellation unit.

2. The image editing device according to claim 1, further comprising:
    an edit function processing unit for selecting at least one edit function from among one or a plurality of edit functions by indicating it with a unit for designating position and applying the selected edit function to an object that is included in the edit area or the rectangular area.

3. The image editing device according to claim 2, further comprising:
    an error informing unit for, when no edit area or rectangular area has been selected but at least one edit function has been indicated and selected from among the one or the plurality of edit functions using the unit for designating position, informing a user of an error.

4. The image editing device according to claim 2, wherein after an edit function was applied by said edit function processing unit, selection of the edit area or rectangular area is cancelled.

5. An image editing method, comprising:
    an area selection step of selecting, in a new area mode, an edit area of an image by surrounding the edit area with a frame;
    an extraction step of extracting a rectangular area originally included in the image;
    a storing step of storing, for each area which is an edit area selected in said area selection step or a rectangular area extracted in said extraction step, in an edit area management table,
        a second item that indicates whether the area is selected or not,
        a third item that indicates whether the area is an edit area or a rectangular area,
        a fourth item that indicates information regarding other edit areas and rectangular areas which are contained in the area, and
        a fifth item that indicates information regarding objects which are handwritten into the area and become part of the image;

a cancellation step of cancelling, in an area selection cancellation mode, a selection of the edit area or the rectangular area; and an area re-selection step of re-selecting, in an area selection mode, the edit area or the rectangular area by designating one of the objects once in the edit area or the rectangular area and retrieving the area vector of the edit area or the area vector of the rectangular area stored in the edit area management table based on object information regarding the designated object, after cancelling the selection of the edit area or the rectangular area in said cancellation step, wherein at least some of said steps are performed using a computer.

6. The image editing method according to claim 5, further comprising:

an edit function processing step of, for an object included in the edit area or the rectangular area, selecting at least one edit function from among one or a plurality of edit functions by indicating it using a unit for designating position, and applying the selected edit function.

7. The image editing method according to claim 6, further comprising:

an error informing step of, when there is no edit area or rectangular area has been selected but at least one edit function has been indicated and selected from among the one or the plurality of edit functions using the unit for designating position, informing a user of an error.

8. The image editing method according to claim 6, wherein after an edit function was applied in said edit function processing step, selection of the edit area or the rectangular area is cancelled.

9. A non-transitory computer-readable recording medium having computer-executable instructions for causing a computer to perform an image editing method, the method comprising:

an area selection step of selecting, in a new area mode, an edit area of an image by surrounding the edit area with a frame;

an extraction step of extracting a rectangular area originally included in the image;

a storing step of storing, for each area which is an edit area selected in said area selection step or a rectangular area extracted in said extraction step, in an edit area management table, a first item that indicates an area vector, a second item that indicates whether the area is selected or not, a third item that indicates whether the area is an edit area or a rectangular area, a fourth item that indicates information regarding other edit areas and rectangular areas which are contained in the area, and a fifth item that indicates information regarding objects which are handwritten into the area and become part of the image;

a cancellation step of cancelling, in an area selection cancellation mode, selection of the edit area or the rectangular area; and an area re-selection step of re-selecting, in an area selection mode, the edit area or the rectangular area by designating one of the objects once in the edit area or the rectangular area and retrieving the area vector of the edit area or the area vector of the rectangular area stored in the edit area management table based on object information regarding the designated object, after cancelling the selection of the edit area or the rectangular area in said cancellation step.

* * * * *